US012168459B2

(12) United States Patent
Kim

(10) Patent No.: US 12,168,459 B2
(45) Date of Patent: Dec. 17, 2024

(54) VEHICLE PATH CONTROL APPARATUS AND VEHICLE PATH CONTROL METHOD

(71) Applicants: Hyundai Motor Company, Seoul (KR); Kia Corporation, Seoul (KR)

(72) Inventor: Kyeong Eun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 263 days.

(21) Appl. No.: 17/877,048

(22) Filed: Jul. 29, 2022

(65) Prior Publication Data

US 2023/0033172 A1 Feb. 2, 2023

(30) Foreign Application Priority Data

Jul. 30, 2021 (KR) .................. 10-2021-0100487

(51) Int. Cl.
*B60W 60/00* (2020.01)
*B60W 50/14* (2020.01)

(52) U.S. Cl.
CPC ........ *B60W 60/0017* (2020.02); *B60W 50/14* (2013.01); *B60W 60/0027* (2020.02); *B60W 2552/10* (2020.02); *B60W 2554/4046* (2020.02); *B60W 2556/45* (2020.02)

(58) Field of Classification Search
CPC ......... B60W 60/0017; B60W 60/0027; B60W 50/14; B60W 2552/10; B60W 2554/4046; B60W 2556/45
USPC .......................................................... 701/26
See application file for complete search history.

(56) References Cited

U.S. PATENT DOCUMENTS

| 10,269,242 B2 | 4/2019 | Ahmad et al. |
| 10,872,379 B1 * | 12/2020 | Nepomuceno ....... G08G 1/0129 |
| 11,708,092 B2 * | 7/2023 | Isele ..................... B60W 10/20 |
| | | 701/26 |

(Continued)

FOREIGN PATENT DOCUMENTS

| CN | 111741884 A * | 10/2020 | ............ B60W 40/09 |
| CN | 112581786 A * | 3/2021 | ............ B60K 35/00 |

(Continued)

OTHER PUBLICATIONS

Xu, et al. Integrating Surrounding Vehicle Information for Vehicle Trajectory Representation and Abnormal Lane-Change Behavior Detection. Sensors (Basel). Dec. 13, 2023;23(24):9800. doi: 10.3390/s23249800. PMID: 38139645; PMCID: PMC10747036. (https://www.ncbi.nlm.nih.gov/pmc/articles/PMC10747036/) (Year: 2023).*

*Primary Examiner* — Atul Trivedi
(74) *Attorney, Agent, or Firm* — Fox Rothschild LLP

(57) ABSTRACT

Disclosed is a vehicle path control apparatus including a memory provided to store danger driving vehicle data, a communication device provided to receive road information from an external server, and a processor configured to identify a danger driving vehicle driving on a road based on the road information and the danger driving vehicle data, select an unmanned vehicle driving within a preset distance from the danger driving vehicle based on the road information, generate a driving path of the unmanned vehicle for obstructing a course of the danger driving vehicle based on an expected path of the danger driving vehicle, and control the communication device to transmit information on the driving path to the unmanned vehicle.

18 Claims, 17 Drawing Sheets

(56) References Cited

U.S. PATENT DOCUMENTS

| | | | |
|---|---|---|---|
| 2018/0174446 A1* | 6/2018 | Wang | G08G 1/096716 |
| 2019/0023268 A1* | 1/2019 | Pink | B60W 30/10 |
| 2020/0255035 A1* | 8/2020 | Sonntag | G08G 1/166 |
| 2020/0262423 A1* | 8/2020 | Oboril | G08G 1/161 |
| 2020/0262449 A1* | 8/2020 | Pan | H04W 4/90 |
| 2020/0339109 A1* | 10/2020 | Hong | B60W 30/08 |
| 2020/0339157 A1* | 10/2020 | Yurdana | B60K 35/70 |
| 2020/0342756 A1* | 10/2020 | MacKenzie | B60W 50/0098 |
| 2021/0009157 A1* | 1/2021 | Fukuda | G08G 1/22 |
| 2021/0031773 A1* | 2/2021 | Augst | B60W 50/10 |
| 2021/0070286 A1* | 3/2021 | Green | G06V 10/25 |
| 2021/0129866 A1* | 5/2021 | Yaskevich | B60W 30/0956 |
| 2021/0134156 A1* | 5/2021 | Lee | G08G 1/166 |
| 2021/0155263 A1* | 5/2021 | Park | B60W 30/182 |
| 2021/0174684 A1* | 6/2021 | McFarland, Jr. | G06Q 40/08 |
| 2021/0188261 A1* | 6/2021 | Song | B60W 40/105 |
| 2021/0197858 A1* | 7/2021 | Zhang | G08G 1/161 |
| 2021/0223391 A1* | 7/2021 | Drysch | G08G 1/0129 |
| 2021/0237723 A1* | 8/2021 | Lee | G08G 1/167 |
| 2021/0240190 A1* | 8/2021 | Wray | G06F 40/186 |
| 2021/0245742 A1* | 8/2021 | Ha | H04W 4/90 |
| 2021/0245775 A1* | 8/2021 | Subramanian | B60W 50/14 |
| 2022/0204030 A1* | 6/2022 | Nishimura | B60W 30/0956 |
| 2022/0340148 A1* | 10/2022 | Rosenbaum | G06F 11/3409 |
| 2022/0355802 A1* | 11/2022 | Chaves | B60W 40/09 |
| 2023/0033172 A1* | 2/2023 | Kim | B60W 60/0015 |
| 2023/0037767 A1* | 2/2023 | Yang | G08G 1/167 |
| 2023/0067538 A1* | 3/2023 | Willoughby | B60W 60/0015 |
| 2023/0182777 A1* | 6/2023 | Cheon | B60Q 9/00 340/576 |
| 2023/0202520 A1* | 6/2023 | Horiuchi | B60W 60/0013 701/26 |
| 2023/0256999 A1* | 8/2023 | Donderici | B60W 50/0097 701/301 |
| 2023/0278584 A1* | 9/2023 | Pyun | G01C 21/3658 |
| 2023/0347882 A1* | 11/2023 | Tian | B60W 30/0956 |
| 2023/0406309 A1* | 12/2023 | Seo | B60W 30/18163 |
| 2024/0025395 A1* | 1/2024 | Omari | B60W 60/0015 |
| 2024/0025443 A1* | 1/2024 | Omari | B60W 30/18159 |
| 2024/0025444 A1* | 1/2024 | Omari | B60W 60/0015 |
| 2024/0067164 A1* | 2/2024 | Gierzynski | B60W 30/09 |

FOREIGN PATENT DOCUMENTS

| | | | | |
|---|---|---|---|---|
| CN | 115195779 A | * | 10/2022 | B60W 10/18 |
| CN | 115214649 A | * | 10/2022 | B60W 30/0956 |
| CN | 117087661 A | * | 11/2023 | B60W 30/0956 |
| KR | 20220056123 A | * | 5/2022 | B60W 60/0015 |
| WO | WO-2021182655 A1 | * | 9/2021 | B60W 60/001 |
| WO | WO-2022231721 A1 | * | 11/2022 | B60W 40/09 |
| WO | WO-2022232292 A1 | * | 11/2022 | B60W 30/0956 |

* cited by examiner

FIG. 2

LIST OF DANGER DRIVING VEHICLES

| VEHICLE NUMBER | CLASSIFICATION | SURROUNDING UNMANNED VEHICLE | SYSTEM OPERATING STATE | ADDITION/ DELETION |
|---|---|---|---|---|
| 00LA2723 | SUSPECTED DRINKING | TWO | IN OPERATION | ⊖ |
| 27B8044 | ESCAPE | THREE | IN OPERATION | ⊖ |
| 112C0842 | CONTINUED SPEEDING | ZERO | SEARCHING FOR UNMANNED VEHICLES | ⊖ |
|  |  |  |  | ⊕ |

VEHICLE PATH CONTROL APPARATUS AND VEHICLE PATH CONTROL METHOD

CROSS-REFERENCE TO RELATED APPLICATION(S)

This application is based on and claims under 35 U.S.C. § 119 the benefit of Korean Patent Application No. 10-2021-0100487, filed on Jul. 30, 2021, in the Korean Intellectual Property Office, the present disclosure of which is incorporated by reference herein in its entirety.

TECHNICAL FIELD

The present disclosure relates to a vehicle path control apparatus, a control method thereof, and a system for obstructing a course of a danger driving vehicle using the same.

DESCRIPTION OF THE RELATED ART

In general, a vehicle refers to a means of transportation that travels on a road or track using fossil fuels, electricity, or the like as a power source.

Recently, research on autonomous vehicles is continuing. An autonomous vehicle refers to a vehicle that may drive itself without the manipulation of a driver or passengers.

An autonomous vehicle has a wide range of uses, and may also be used to block a path of an illegal vehicle or danger driving vehicle. Because a non-autonomous vehicle, which is not an autonomous vehicle, is driven by human intervention, a personal accident may occur when the non-autonomous vehicle is used to obstruct a path of a danger driving vehicle.

SUMMARY

It is an exemplary embodiment of the present disclosure to provide a vehicle path control apparatus and a vehicle path control method capable of obstructing a course of a danger driving vehicle by controlling a path of an unmanned vehicle driving around the danger driving vehicle.

Additional embodiments of the present disclosure will be set forth in part in the description which follows and, in part, will be obvious from the description, or may be learned by practice of the present disclosure.

In accordance with an exemplary embodiment of the present disclosure, a vehicle path control apparatus includes a memory provided to store danger driving vehicle data, a communication device provided to receive road information from an external server, and a processor configured to identify a danger driving vehicle driving on a road based on the road information and the danger driving vehicle data, select an unmanned vehicle driving within a preset distance from the danger driving vehicle based on the road information, generate a driving path of the unmanned vehicle for obstructing a course of the danger driving vehicle based on an expected path of the danger driving vehicle, and control the communication device to transmit information on the driving path to the unmanned vehicle.

The processor may be configured to determine priority in the order in which the unmanned vehicle suffers a small damage and select the unmanned vehicle depending on the priority.

The processor may be configured to determine the number of the unmanned vehicles based on the number of lanes.

The processor may be configured to notify an owner of the unmanned vehicle and surrounding vehicles that the unmanned vehicle is used to obstruct a course of a dangerous vehicle.

The processor may be configured to block a lane change until the danger driving vehicle passes a branchable driving path.

The processor may be configured to calculate a danger driving score of a vehicle and to determine the vehicle as the danger driving vehicle when the score is higher than or equal to a preset score.

The processor may be configured to put the unmanned vehicle on standby until there is a user input, based on the stopping of the danger driving vehicle.

Addition or deletion of the danger driving vehicle to or from the danger driving vehicle data may be possible by a user through a user interface.

In accordance with an exemplary embodiment of the present disclosure, a vehicle path control method includes determining whether a vehicle is a danger driving vehicle based on road information collected, identifying the danger driving vehicle driving on a road based on the road information and danger driving vehicle data, selecting an unmanned vehicle driving within a preset distance with respect to the danger driving vehicle based on the road information, generating a driving path of the unmanned vehicle for obstructing a course of the danger driving vehicle based on an expected path of the danger driving vehicle, and transmitting information on the driving path to the unmanned vehicle through a communication device.

The selecting of the unmanned vehicle may include determining the number of the unmanned vehicles based on the number of lanes.

The selecting of the unmanned vehicle may include notifying an owner of the unmanned vehicle and surrounding vehicles that the unmanned vehicle is used to obstruct a course of a dangerous vehicle.

The selecting of the unmanned vehicle may include determining priority in the order in which the unmanned vehicle suffers a small damage and selecting the unmanned vehicle depending on the priority.

The generating of the driving path of the unmanned vehicle may include blocking a lane change until the danger driving vehicle passes a branchable driving path.

The generating of the danger driving vehicle data may include calculating a danger driving score of a vehicle and determining the vehicle as the danger driving vehicle when the score is higher than or equal to a preset score.

The generating of the danger driving vehicle data may include adding or deleting the danger driving vehicle to or from the danger driving vehicle data by a user.

The generating of the danger driving vehicle data may include putting the unmanned vehicle on standby until there is a user input, based on the stopping of the danger driving vehicle.

As discussed, the method and system suitably include use of a controller or processor.

In another embodiment, vehicles are provided that comprise the vehicle path control apparatus as disclosed herein. The vehicle may further comprise a sensor device configured to detect surrounding environment; recognize vehicle information; and communicate with the memory, the communication device and the processor.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

These and/or other embodiments of the present disclosure will become apparent and more readily appreciated from the following description of the embodiments, taken in conjunction with the accompanying drawings of which:

FIG. 2 is a table illustrating a list of danger driving vehicles managed by the vehicle path control apparatus according to an exemplary embodiment;

DETAILED DESCRIPTION

Figure 1:
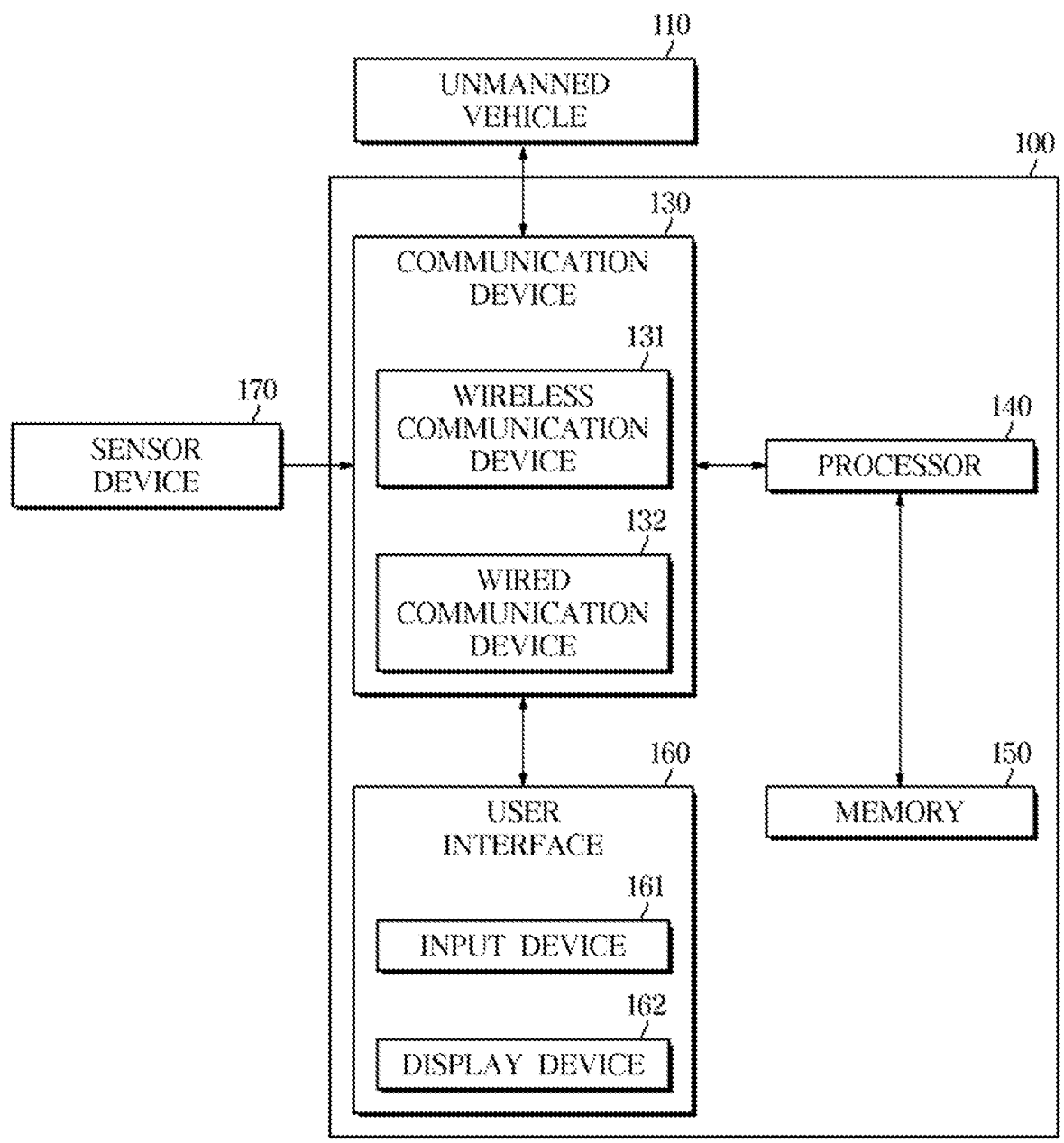
FIG. 1 is a control block diagram of a vehicle path control apparatus according to an exemplary embodiment.

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

In addition, terms such as "~unit", "~part," "~block," "~member," "~module," and the like may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit" "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference numerals used in operations are provided for convenience of description, without describing the order of the operations, and the operations may be executed in a different order from the stated order unless a specific order is definitely specified in the context.

The disclosed embodiments may be implemented in the form of a recording medium storing instructions executable by a computer. The instructions may be stored in the form of program code, and when executed by a processor, may perform the operations of the disclosed embodiments. The recording medium may be implemented as a computer-readable recording medium.

The computer-readable recording medium includes all types of recording media in which instructions readable by the computer are stored, The computer-readable recording medium may include, for example, a read only memory (ROM), a random access memory (RAM), a magnetic tape, a magnetic disk, a flash memory, an optical data storage device, and the like.

Hereinafter, an exemplary embodiment of a vehicle and a vehicle control method will be described in detail with reference to the accompanying drawings.

FIG. 1 is a control block diagram of a vehicle path control apparatus according to an exemplary embodiment.

Referring to FIG. 1, a vehicle path control apparatus 100 includes a communication device 130, a processor 140, a memory 150, and a user interface 160.

The communication device 130 may communicate with an autonomous vehicle through a wireless communication base station, and may include a wireless communication device 131 and a wired communication device 132.

As an example of a communication method, the communication device 130 may employ a second generation (2G) communication method such as a TDMA (Time Division Multiple Access) and a CDMA (Code Division Multiple Access), a third generation (3G) communication method such as an WCDMA (Wide Code Division Multiple Access), a CDMA 2000 (Code Division Multiple Access 2000). an WiBro (Wireless Broadband), and an WiMAX (World Interoperability for Microwave Access), and a fourth generation (4G) communication method such as LTE (Long Term Evolution) and an WBE (Wireless Broadband Evolution). The communication device 130 may employ a fifth generation (5G) communication method.

The communication device 130 may include one or more components that enable communication with an external device, and may include, for example, at least one of a short-range communication module, the wired communication device 132, and the wireless communication device 131.

The short-range communication module may include various short-range communication modules that transmit and receive signals using a wireless communication network in a short distance such as a Bluetooth module, an infrared communication module, an RFID (Radio Frequency Identification) communication module, an NFC (Near Field Communication) module, and a Zigbee communication module.

The wired communication device 132 may include various wired communication modules such as a CAN (Controller Area Network) communication module, a LAN (Local Area Network) module, a WAN (Wide Area Network) module, and a VAN (Value Added Network) module, as well as various cable communication modules such as a USB (Universal Serial Bus), an FIDMI (High Definition Multimedia Interface), a DVI (Digital Visual Interface), an RS-232 (recommended standard 232). power line communication, and a POTS (plain old telephone service).

The wireless communication device 131, in addition to a RDS-TMC (Radio Data System-Traffic Message Channel), DMB (Digital Multimedia Broadcasting), a Wi-Fi module, and a wireless broadband module, may include wireless communication modules supporting various wireless communication methods such as a GSM (Global System for Mobile Communication), a CDMA (Code Division Multiple Access), a WCDMA (Wideband Code Division Multiple Access), a UMTS (Universal Mobile Telecommunications System), a TDMA (Time Division Multiple Access), and LTE (Long Term Evolution).

The wireless communication device 131 may include a wireless communication interface including an antenna and a receiver for receiving a traffic information signal. The wireless communication device 131 may further include a traffic information signal conversion module for demodulating an analog wireless signal received through the wireless communication interface into a digital control signal.

The communication device 130 may receive the collected road information from an external server (not shown) when road information such as CCTVs information on roads, speed cameras, sensor data of autonomous vehicles, and surrounding vehicle data is collected.

The communication device 130 may communicate with an unmanned vehicle 110 and transmit a road situation determined by the processor 140, data of the danger driving vehicle 120, a path of the unmanned vehicle 110, and a speed profile, to the unmanned vehicle 110.

The communication device 130 may receive road information such as CCTV information of a road, a speed camera, sensor data of autonomous vehicles and data of surrounding vehicles from an external server, and may also receive road information from various sensors of the autonomous vehicles.

A sensor device 170 of the unmanned vehicle 110 may include a camera, a radar, and a lidar sensor as sensors for detecting the surrounding environment, and may include a wheel speed sensor, a yaw rate sensor, and a global positioning system (GPS) sensor as sensors for recognizing own vehicle information.

The sensor device 170 of the unmanned vehicle 110 is not limited thereto, and may include any sensor capable of detecting driving environment information around the vehicle.

The processor 140 may determine the road situation based on the collected road information. The processor 140 may map an object to a precise road map based on the collected road information.

The precision road map may refer to an electronic map that provides driving environment information such as road traffic, regulation and facility information in high precision three-dimensional for autonomous driving of the unmanned vehicle 110.

The precision road map may be classified into a high-resolution precision map, a high-precision electronic map, an ADAS (Advanced Driver Assistance Systems) map, a HD (High Definition) map, and the like, depending on fields.

The processor 140 may map objects including surrounding terrain, lanes, and driving trajectories including surrounding obstacles on the precision road map, and may estimate a location, speed, and expected path of vehicles on the road based on the result of the mapping.

The processor 140 may determine whether a vehicle is the danger driving vehicle 120 by calculating and accumulating driving scores of vehicles driving on the road based on criteria such as Whether the vehicles on the road are speeding, lane instability, and whether the vehicles change several lanes at once.

The processor 140 may select the unmanned vehicle 110 that may be deployed to obstruct a course around the danger driving vehicle 120.

The processor 140 may identify the unmanned vehicle 110 driving within a preset distance from a vehicle determined as the danger driving vehicle 120. The processor 140 may set the preset distance differently depending on a user input, or may calculate a minimum distance capable of obstructing a path of the danger driving vehicle 120 by acceleration based on a speed of the danger driving vehicle 120.

The unmanned vehicle 110 selectable by the processor 140 may be an autonomous vehicle capable of driving along a path set by the processor 140, and at the same time may be a vehicle that is not already used in the vehicle path control apparatus 100.

The processor 140 may consider a state of a vehicle to select the unmanned vehicle 110, and the state of the vehicle considered by the processor 140 may be whether a sensor of the vehicle, the communication device 130 of the vehicle, and a processor 140 of the vehicle are malfunctioning and whether the vehicle is being used for an emergency purpose.

The number of the unmanned vehicle 110 required for the processor 140 to stop the danger driving vehicle 120 may be two in two lanes and three in three or more lanes.

The processor 140 may determine priority in the order in which damage of the unmanned vehicle 110 is small based on determination that the number of the unmanned vehicles 110 that may be deployed is greater than the number of the unmanned vehicles 110 required to stop the danger driving vehicle 120.

In the determination of priority, the processor 140 may determine as a high priority a vehicle closer to the danger driving vehicle 120, a transportation vehicle with a little of luggage, an unmanned taxi vehicle with a long distance to reach a user, a vehicle having a low vehicle price, and a vehicle having a longer drivable distance.

Conversely, the processor 140 may determine as a low priority a vehicle further away from the danger driving vehicle 120, a transportation vehicle loaded with a lot of luggage, an unmanned taxi vehicle with a short distance to reach the user, a vehicle having a high vehicle price, and a vehicle having a shorter drivable distance.

The determination of the priority by the processor 140 is not limited thereto, and as long as the damage to the unmanned vehicle 110 is small, any situation may be included in a priority determination target.

The processor 140 may determine the priority and select the unmanned vehicle 110 in the order of the highest priority according to the determined priority.

The processor 140 may determine the number of the unmanned vehicles 1i0 to be deployed to completely stop the danger driving vehicle 120 based on the number of lanes.

When a minimum number (two for two lanes and three for three lanes or more) of the unmanned vehicles 110 required to stop the danger driving vehicle 120 is satisfied, the processor 140 may employ the unmanned vehicles 110 of the number greater than the minimum number.

The determination of the number of unmanned vehicles 110 by the processor 140 is based on the number of lanes, and the number of the unmanned vehicles 110 may also be determined including a use time of the unmanned vehicle 110 an amount of fuel used, and a compensation amount of money in consideration of how far the unmanned vehicle 110 deviated from the existing path.

When the employable unmanned vehicle 110 is selected, the processor 140 may notify surrounding vehicles and users driving on the road of the unmanned vehicle 110 that the unmanned vehicle 110 is used for the vehicle path control apparatus 100.

A method by which the processor 140 notifies the surrounding vehicles driving on the road that the unmanned vehicle 110 is used for a path control may be V2V (Vehicle to Vehicle) communication.

The V2V (Vehicle to Vehicle) communication refers to communication between vehicles, and each vehicle may transmit and receive data through its own wireless communication. The V2V (Vehicle to Vehicle) communication may utilize all types of wireless components so that vehicles may communicate with each other and form a VANET (Vehicle Ad Hoc Network).

There is no limitation in that the processor 140 notifies the surrounding vehicles that the unmanned vehicle 110 is used for path control.

The method by which the processor 140 notifies the user of the unmanned vehicle 110 that the unmanned vehicle 110 is used for path control may be a method through a smart device paired with the unmanned vehicle 110.

When the user of the unmanned vehicle 110 controls the unmanned vehicle 110 through the smart device such as a smart phone, a message or a notification indicating that the unmanned vehicle 110 is used for the vehicle path control apparatus 100 may be received on the smart phone.

There is no limitation in that the processor 140 notifies the user of the unmanned vehicle 110 that the unmanned vehicle 110 is used for path control as long as the user of the unmanned vehicle 110 may know that a control right of the unmanned vehicle 110 is transferred.

When the unmanned vehicle 110 is used for path control and may not be used for its original purpose, the processor 140 may present an appropriate alternative to the user of the unmanned vehicle 110 according to the purpose of the unmanned vehicle 110.

For example, when the unmanned vehicle 110 used for path control is an autonomous taxi, the processor 140 may connect communication to call another taxi nearby, and When the unmanned vehicle 110 used for path control is an autonomous driving logistics transport vehicle, the processor 140 may notify that delivery may be delayed by the time required for path control.

When the unmanned vehicle 110 is selected, the processor 140 may generate a path of the unmanned vehicle 110 in order to obstruct the path of the danger driving vehicle 120.

An algorithm for predicting and tracking the path of the danger driving vehicle 120 may be used to generate the path of the unmanned vehicle 110, and any method capable of predicting and tracking the path of the danger driving vehicle 120 may be used.

For example, a method to which an extended Kalman filter is applied may be used. The extended Kalman filter may be an algorithm for tracking an optimal value through recursive data processing based on past data and current data.

For example, when a radar is used in a process of predicting the path of the danger driving vehicle 120 and generating the path of the unmanned vehicle 110, a location, speed, acceleration, etc, of the danger driving vehicle 120 may be measured, but an error may be included in the measured values.

In this case, the location of the danger driving vehicle 120 may be estimated by using the Kalman filter for continuously measured values, and the error may be reduced by using the estimated location again as the past data.

Specifically, the calculation of the Kalman filter may include a prediction step and an estimation step. A predicted value according to the prediction step of the Kalman filter may be a value for calculating a result predicted according to an input value input to the Kalman filter and an estimated value of a previously calculated Kalman filter.

An estimated value according to the estimation step of the Kalman filter may be a value for calculating a result estimated from a predicted value of the linear Kalman filter, a covariance estimate value indicating a relationship between information used for calculation of the Kalman filter, and a measured value calculated according to a state vector of an input value.

In this case, the processor 140 may alternately perform the prediction calculation of the Kalman filter and the estimation calculation of the Kalman filter, and may, as another form, repeat the prediction calculation of the Kalman filter for an arbitrarily set number of times and then perform the estimation calculation of the Kalman filter.

The processor 140 may calculate the estimated value of the Kalman filter and output it as a coordinate value of the danger driving vehicle 120, and the estimated value of the Kalman filter may be used when the predicted value of the Kalman filter, which is newly calculated over time, is calculated.

Another example in which the processor 140 predicts the path of the danger driving vehicle 120 in order to generate a path of the unmanned vehicle 110 may be to obtain a control right for the danger driving vehicle 120.

When the danger driving vehicle 120 is equipped with a navigation system, the processor 140 may obtain a control right of the navigation system. When the processor 140 obtains the control right of the navigation system, the processor 140 may know a destination in a case where the destination is input to the navigation, and may operate a voice recognition function to predict a path through a voice of a driver of the danger driving vehicle 120.

When the path of the danger driving vehicle 120 is predicted the processor 140 may generate a path of the unmanned vehicle 110 to block the path of the danger driving vehicle 120.

In the generation of the path of the unmanned vehicle 110 by the processor 140, information on a predicted arrival time to a specific point of the danger driving vehicle 120 may be taken into consideration.

The processor 140 may compare information on an arrival time to the specific point of the danger driving vehicle 120 with information on an arrival time to the specific point of the unmanned vehicle 110 and determine whether there is a possibility of a front-end collision or a rear-end collision between the unmanned vehicle 110 and the danger driving vehicle 120 at a corresponding point.

The processor 140 may generate a path with a low probability of a front-end collision or a rear-end collision as the path of the unmanned vehicle 110 in consideration of the possibility of the front-end collision or the rear-end collision between the unmanned vehicle 110 and the danger driving vehicle 120.

The processor 140 may transmit the generated path of the unmanned vehicle 110 to the unmanned vehicle 110 through the communication device 130. The processor 140 may transmit the generated path of the unmanned vehicle 110 to the unmanned vehicle 110 and then additionally transmit the generated path to the smart device of the user of the unmanned vehicle 110.

The memory 150 may include a volatile memory such as a static random access memory (S-RAM) or a dynamic random access memory (D-RAM) and a non-volatile memory such as a read only memory (ROM) and an erasable programmable read only memory (EPROM). The memory 150 may include one memory device or a plurality of memory devices.

The user interface 160 may refer to a device in which the user of the vehicle path control apparatus 100 may directly add the danger driving vehicle 120 to danger driving vehicle data 200 or delete the danger driving vehicle 120 from the danger driving vehicle data 200.

The user interface 160 may include a display device 162 for displaying the danger driving vehicle data 200 and an input device 161 for receiving an input from a user.

The user interface 160 may be, for example, a smart device for a police officer to crack down on an illegal vehicle, or an electronic device such as a computer or tablet used in a police station control center.

The user interface 160 is not limited to the above-described electronic device as long as it is an electronic device having means for the user to input a vehicle number or risk classification.

FIG. 2 is a table illustrating the danger driving vehicle data 200 managed by the vehicle path control apparatus according to an exemplary embodiment.

Referring to FIG. 2, vehicle numbers of the danger driving vehicles 120 that are objects of path control, classification, the surrounding unmanned vehicles 110, and system operation states are illustrated.

The danger driving vehicle data 200 may be automatically added depending on a danger driving score of a vehicle without user intervention by an exemplary embodiment of the present disclosure.

The danger driving score may be accumulated depending on user input or laws under the Road Traffic Act, and may be updated based on criteria such as speeding, lane instability, and changing multiple lanes at once.

The user may intervene to directly add or delete the danger driving vehicle 120 to or from the danger driving vehicle data 200.

The situation in which the user directly adds may be a situation in which a vehicle that the system may not determine to be the danger driving vehicle 120 is added, a situation in which a vehicle erroneously determined to be the danger driving vehicle 120 by the system is deleted, or a situation in which a vehicle is added as the danger driving vehicle 120 in order to arrest a criminal.

Hereinafter, an exemplary embodiment according to the present disclosure will be described in detail.

Figure 3:
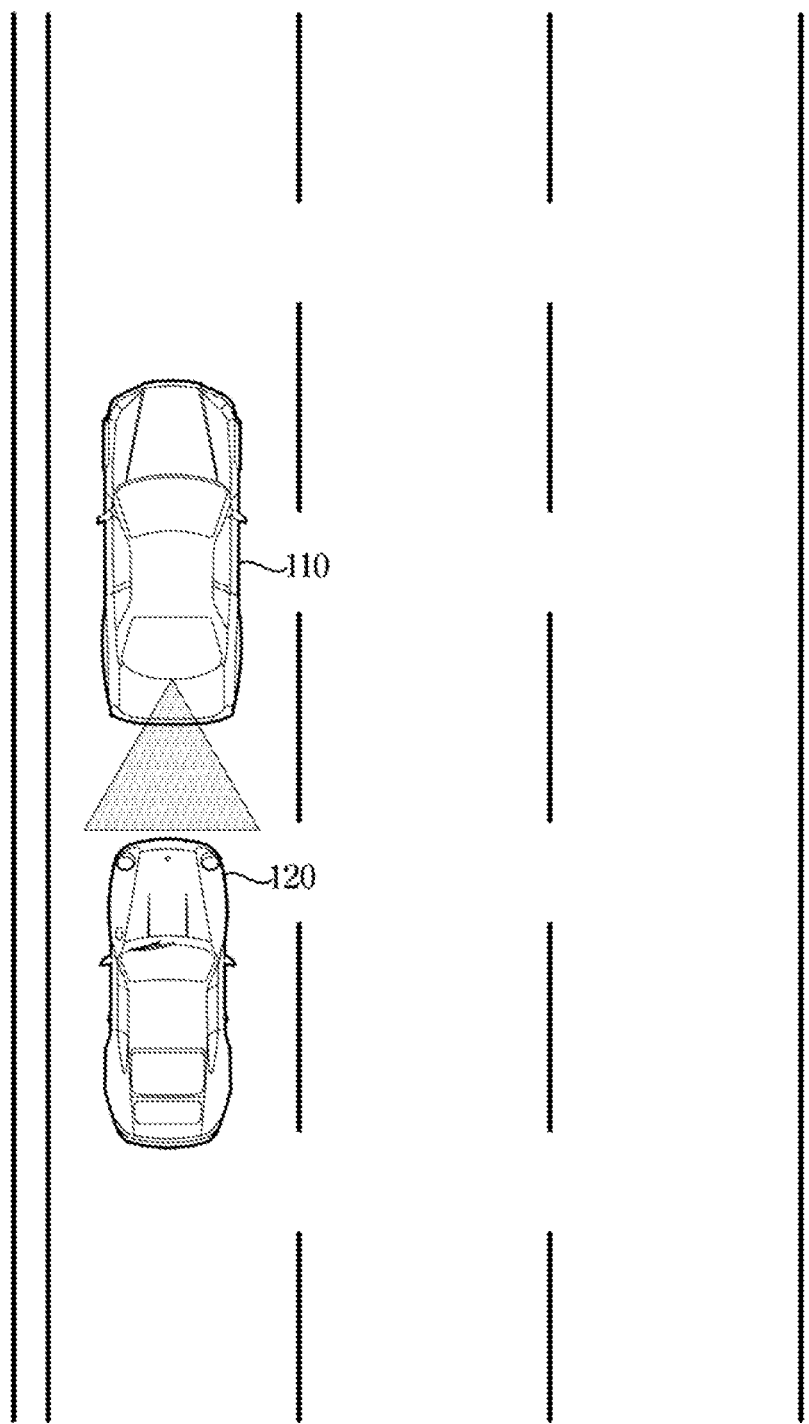
FIG. 3 is a diagram illustrating a case in which a road has two lanes and there is one unmanned vehicle that may be deployed in the vehicle path control apparatus according to an exemplary embodiment.

FIG. 3 is a diagram illustrating a case in which a road has two lanes and there is one of the unmanned vehicle 110 that may be deployed in the vehicle path control apparatus according to an exemplary embodiment.

Referring to FIG. 3, because there is only one of the unmanned vehicle 110, the processor 140 may control a relative position and target speed of the unmanned vehicle 110 to obstruct a front path of the danger driving vehicle 120.

In a case where the processor 140 controls a longitudinal position in the relative position of the unmanned vehicle 110, the processor 140 may control to be positioned at a distance at which a time to collision (TTC) with the danger driving vehicle 120 becomes 3 seconds when driving at the target speed.

When the longitudinal position of the unmanned vehicle 110 is at a position where the time to collision (TTC) becomes less than 3 seconds, a risk of collision may increase, and when the longitudinal position of the unmanned vehicle 110 is at a position where the time to collision (TTC) becomes greater than 3 seconds, it may be difficult to obstruct the path of the danger driving vehicle 120.

The longitudinal position of the unmanned vehicle 110 may be expressed as $P_{longitudinal} = V_{dangerous} - V_{goal} * 3 * s$.

In this case, $P_{longitudinal}$ is the longitudinal position of the unmanned vehicle 110, $V_{dangerous}$ is the speed of the dangerous vehicle, $V_{goal}$ is the target speed, and s means seconds (sec).

In a case where the processor 140 controls a lateral position in the relative position of the unmanned vehicle 110, the processor 140 may control a relative distance to become 0 m in the front of the danger driving vehicle 120.

When the relative distance in the lateral position becomes 0 m, it may mean preventing left and right movement in the front of the danger driving vehicle 120.

When controlling the target speed of the unmanned vehicle 110, the processor 140 may control the target speed to be less than 90% of a safe speed.

The safe speed may refer to the speed limit stipulated in the Road Traffic Act, or may refer to a speed set by the user in consideration of road situations.

For example, because the safe speed is 90 km/h when the danger driving vehicle 120 drives at 130 km/h on a road where the speed limit of 100 km/h is required under the Road Traffic Act, the longitudinal position may be determined as $(130/3.6 - 90/3.6) * 3 = 33.3$ m.

Figure 4:
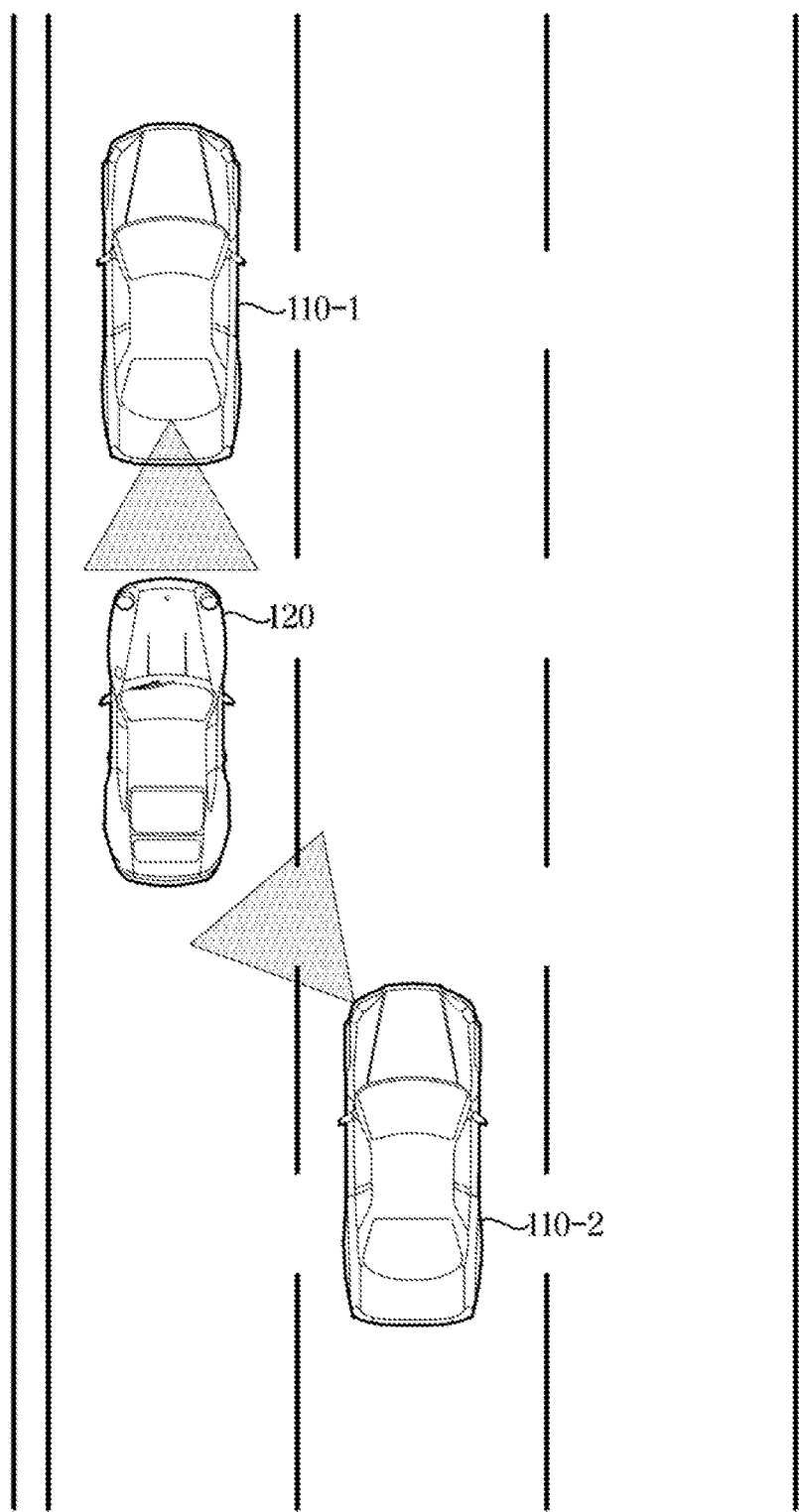
FIG. 4 is a diagram illustrating a case in which the road has two lanes and there are two unmanned vehicles that may be deployed in the vehicle path control apparatus according to an exemplary embodiment.

FIG. 4 is a diagram illustrating a case in which the road has two lanes and there are two of the unmanned vehicles 110 that may be deployed in the vehicle path control apparatus according to an exemplary embodiment.

The processor 140 may differently perform the path control of the unmanned vehicles 110 when the danger driving vehicle 120 is in a first lane.

The processor 140 may control a path of an unmanned vehicle 110-1 located in the front to interfere with the course of the danger driving vehicle 120 and induce deceleration.

The processor 140 may control a longitudinal position of the unmanned vehicle 110-1 located in the front to be located at a distance at which the time to collision (TTC) with the danger driving vehicle 120 becomes 3 seconds when driving at a target speed. The processor 140 may control a lateral position of the unmanned vehicle 110-1 located in the front so that a relative distance becomes 0 m in the front of the danger driving vehicle 120.

When controlling the target speed of the unmanned vehicle 110-1 located in the front, the processor 140 may control the target speed to be less than 90% of the safe speed.

The processor 140 may control an unmanned vehicle 110-2 located at a rear side to a path that blocks the path of another vehicle driving in a second lane so that when the danger driving vehicle 120 changes the lane to the second lane, the unmanned vehicle 110-1 located in the front may also change the lane together.

The processor 140 may control a longitudinal position of the unmanned vehicle 110-2 located at the rear side so that the danger driving vehicle 120 may change the lane to the second lane while a vehicle driving behind the danger driving vehicle 120 is located in the direction of a right taillight of the danger driving vehicle 120 in which lane change is impossible.

The processor 140 may control a lateral position of the unmanned vehicle 110-2 located at the rear side to a position spaced to the right by a width of the lane with respect to the danger driving vehicle 120.

Figure 5:
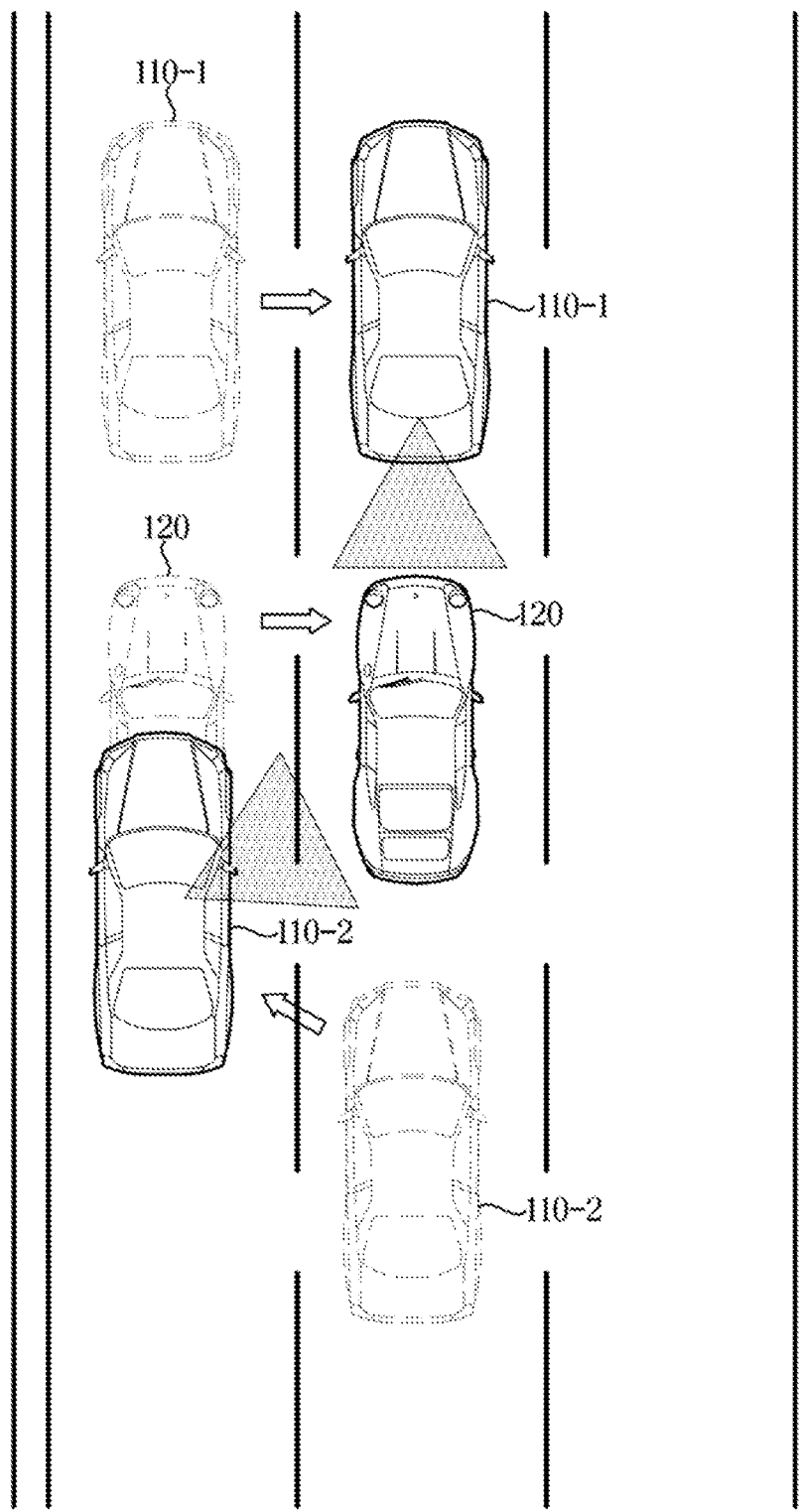
FIG. 5 is a diagram illustrating that a danger driving vehicle changes a lane in the case in which the road has two lanes and there are two unmanned vehicles that may be deployed in the vehicle path control apparatus according to an exemplary embodiment.

FIG. 5 is a diagram illustrating that the danger driving vehicle 120 changes the lane in the case in which the road has two lanes and there are two of the unmanned vehicles 110 that may be deployed in the vehicle path control apparatus according to an exemplary embodiment.

A path control method when the danger driving vehicle 120 changes the lane in the second lane will be described with reference to FIG. 5.

The processor 140 may differently control the unmanned 110 when the danger driving vehicle 120 changes the lane to the right.

The processor 140 may control the longitudinal position of the unmanned vehicle 110-1 located in the front to be maintained as before the lane change of the danger driving vehicle 120.

That is, the processor 140 may control the longitudinal position of the unmanned vehicle 110-1 located in the front to be located at the distance at which the time to collision (TTC) with the danger driving vehicle 120 becomes 3 seconds when driving at the target speed.

The processor 140 may control the lateral position of the unmanned vehicle 110-1 located in the front to be moved in a lane changing direction of the danger driving vehicle 120 by the width of the lane.

When controlling the target speed of the unmanned vehicle 1104 located in the front, the processor 140 may control the target speed to be less than 90% of the safe speed.

The processor 140 may control the longitudinal position of the unmanned vehicle 110-2 located at the rear side to be maintained as before the lane change of the danger driving vehicle 120.

The processor 140 may control the lateral position of the unmanned vehicle 110-2 located at the rear side to a position spaced to the left by the width of the lane with respect to the danger driving vehicle 120.

When controlling the target speed of the unmanned vehicle 110-2 located at the rear side, the processor 140 may control the target speed to be less than 90% of the safe speed.

The processor 140 may induce the path of the danger driving vehicle 120 to a shoulder while obstructing the path of the danger driving vehicle 120 as illustrated in FIG. 5.

Figure 6:
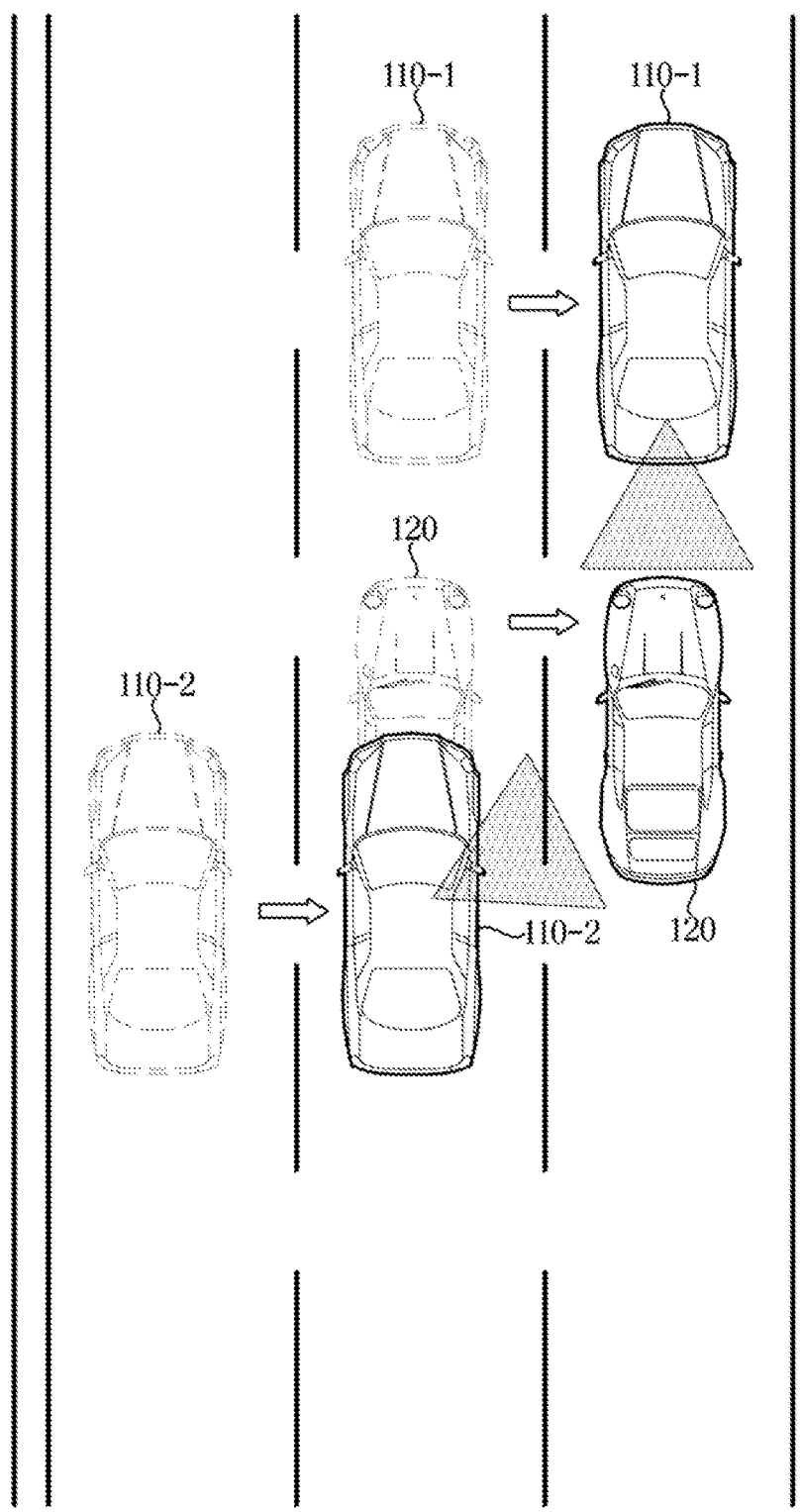
FIG. 6 is a diagram illustrating that the danger driving vehicle changes the lane to drive on a shoulder in the case in which the road has two lanes and there are two unmanned vehicles that may be deployed in the vehicle path control apparatus according to an exemplary embodiment.

FIG. 6 is a diagram illustrating that the danger driving vehicle 120 changes the lane to drive on the shoulder in the case in which the road has two lanes and there are two of the unmanned vehicles 110 that may be deployed in the vehicle path control apparatus according to an exemplary embodiment.

The processor 140 may control the longitudinal position of the unmanned vehicle 110-1 located in the front to be maintained as before the lane change of the danger driving vehicle 120.

That is, the processor 140 may control the longitudinal position of the unmanned vehicle 110-1 located in the front to be located at the distance at which the time to collision (TTC) with the danger driving vehicle 120 becomes 3 seconds when driving at the target speed.

The processor 140 may control the lateral position of the unmanned vehicle 110-1 located in the front to be moved in the lane changing direction of the danger driving vehicle 120 by the width of the lane.

When controlling the target speed of the unmanned vehicle 110-1 located in the front, the processor 140 may control the target speed to be less than 90% of the safe speed.

The processor 140 may control the longitudinal position of the unmanned vehicle 110-2 located at the rear side to be maintained as before the lane change of the danger driving vehicle 120.

The processor 140 may control the lateral position of the unmanned vehicle 110-2 located at the rear side to a position spaced to the right by the width of the lane with respect to the danger driving vehicle 120.

When controlling the target speed of the unmanned vehicle 110-2 located at the rear side, the processor 140 may control the target speed to be less than 90% of the safe speed.

The processor 140 may induce the path of the danger driving vehicle 120 to the shoulder while obstructing the path of the danger driving vehicle 120 as illustrated in FIG. 6.

Figure 7:
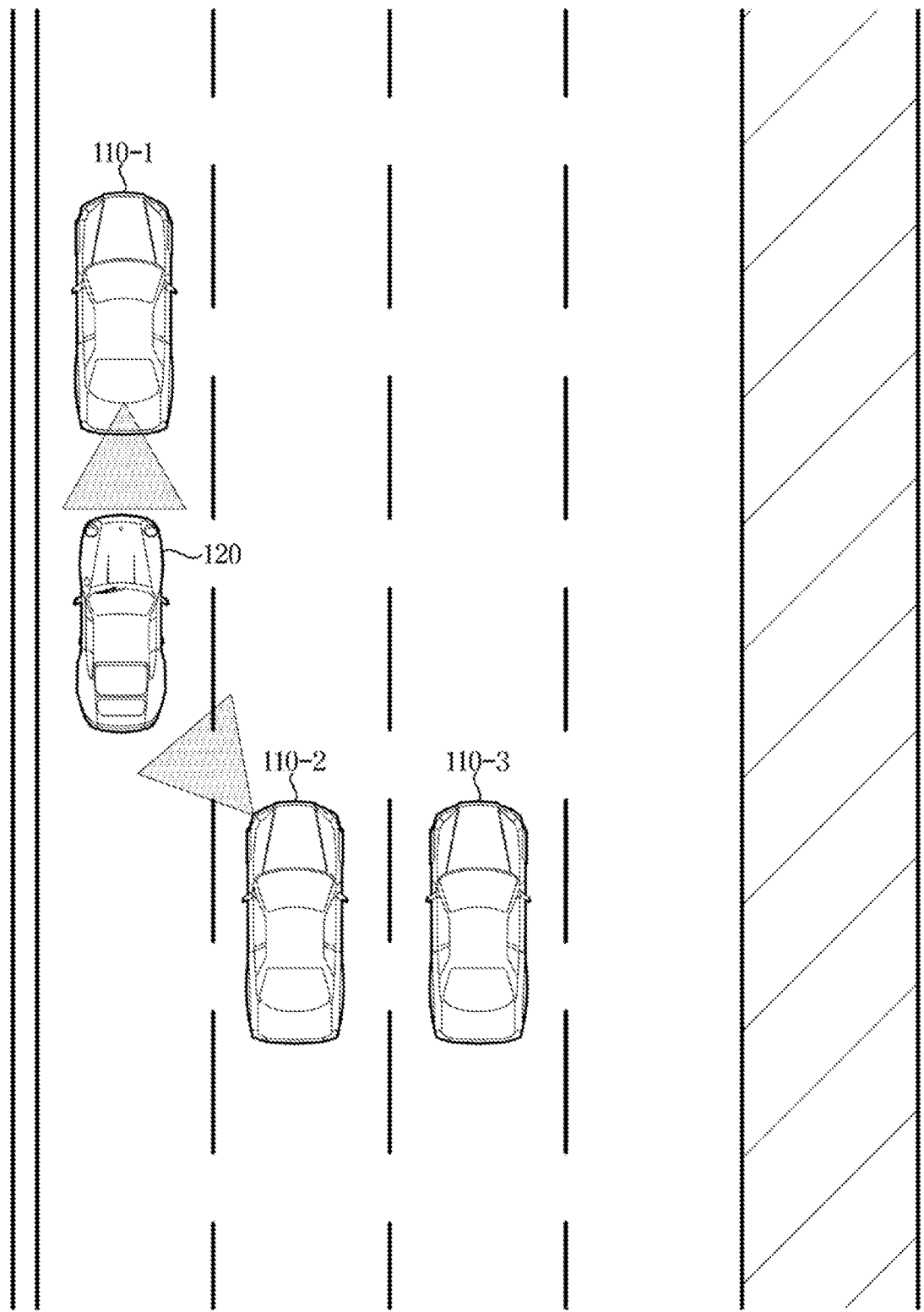
FIG. 7 is a diagram illustrating a case in which the road has three lanes or more and there are three or more unmanned vehicles that may be deployed in the vehicle path control apparatus according to an exemplary embodiment.

FIG. 7 is a diagram illustrating a case in which the road has three lanes or more and there are three or more of the unmanned vehicles 110 that may be deployed in the vehicle path control apparatus according to an exemplary embodiment.

The processor 140 may control the path of the danger driving vehicle 120 by the method described with reference to FIGS. 3 to 6 when there are less than three of the unmanned vehicles 110 that may be deployed even when the road has three or more lanes.

Referring to FIG. 7, the processor 140 may control the longitudinal position of the unmanned vehicle 110-1 located in the front to be located at the distance at which the time to collision (TTC) with the danger driving vehicle 120 becomes 3 seconds when driving at the target speed. The processor 140 may control the lateral position of the unmanned vehicle 110-1 located in the front so that the relative distance becomes 0 m in the front of the danger driving vehicle 120.

When controlling the target speed of the unmanned vehicle 110-1 located in the front, the processor 140 may control the target speed to be less than 90% of the safe speed.

The processor 140 may control an unmanned vehicle 110-2 located at a rear side to a path that blocks the path of another vehicle driving in the second lane so that when the danger driving vehicle 120 changes the lane to the second lane. the unmanned vehicle 110-1 located in the front may also change the lane together.

The processor 140 may control the longitudinal position of the unmanned vehicle 110-2 located at the rear side so that the danger driving vehicle 120 may change the lane to the second lane while a vehicle driving behind the danger driving vehicle 120 is located in the direction of the right taillight of the danger driving vehicle 120 in which lane change is impossible.

The processor 140 may control the lateral position of the unmanned vehicle 110-2 located at the rear side to the position spaced to the right by the width of the lane with respect to the danger driving vehicle 120.

The processor 140 may control an unmanned vehicle 110-3 located in a third lane to occupy the third lane in advance in order to prevent a collision by another vehicle, control a longitudinal position thereof to be the same as that of the unmanned vehicle 110-2 located at a rear side, and control a lateral position thereof to the position spaced to the right by the width of the lane with respect to the unmanned vehicle 110-2 located at the rear side.

The processor 140 may obstruct the path of the danger driving vehicle 120 while preventing an additional accident because the unmanned vehicle 110-3 located in the third lane blocks the entry of another vehicle.

Figure 8:
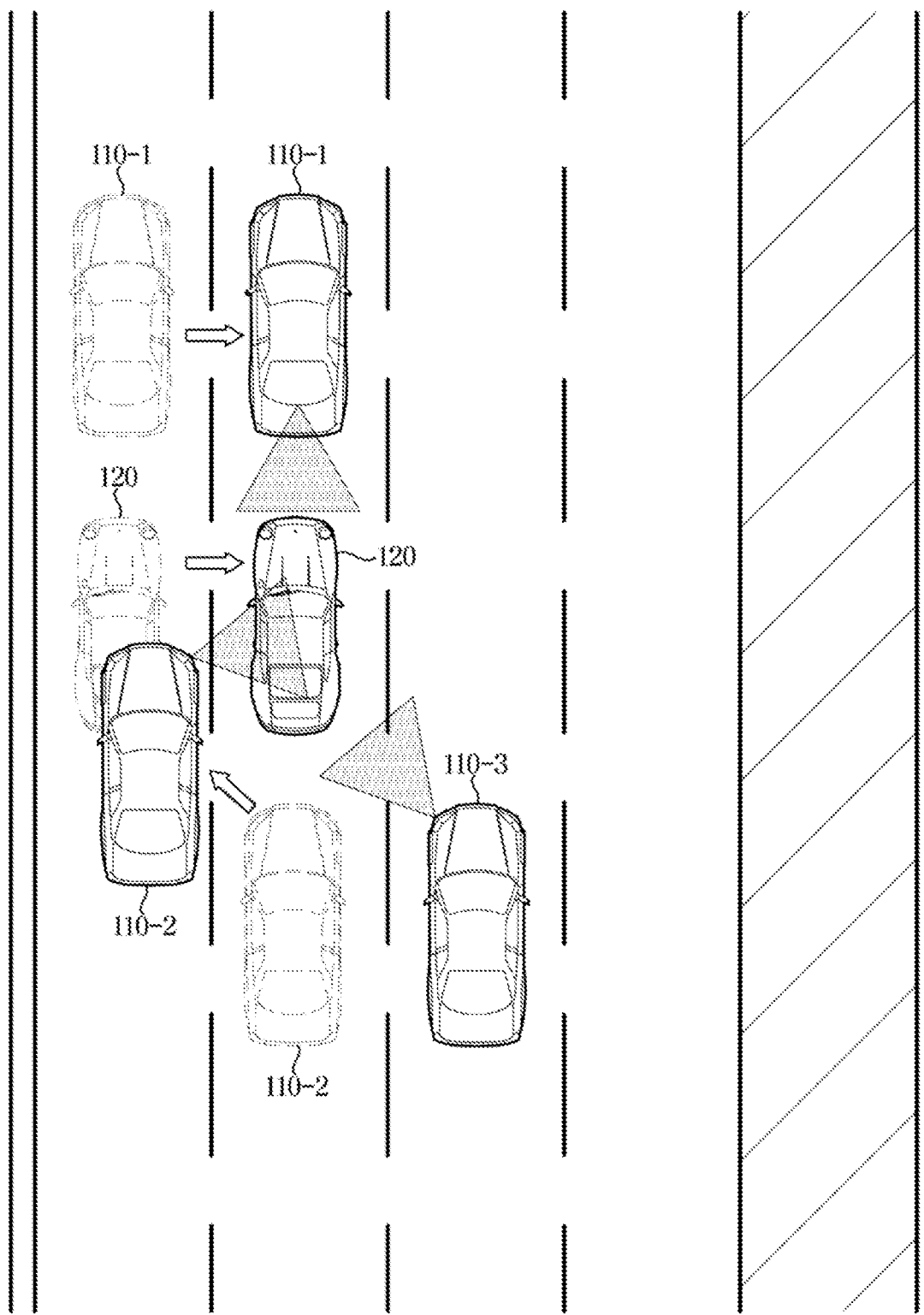
FIG. 8 is a diagram illustrating that the danger driving vehicle changes the lane to a second lane in the case in which the road has three lanes or more and there are three or more unmanned vehicles that may be deployed in the vehicle path control apparatus according to an exemplary embodiment.

FIG. 8 is a diagram illustrating that the danger driving vehicle 120 changes the lane to the second lane in the case in which the road has three lanes or more and there are three or more of the unmanned vehicles 110 that may be deployed in the vehicle path control apparatus according to an exemplary embodiment.

FIG. 8 illustrates a method of inducing the danger driving vehicle 120 to drive in a right direction with respect to a center line.

The processor 140 may control the longitudinal position of the unmanned vehicle 110-1 located in the front to be located at the distance at which the time to collision (TTC) with the danger driving vehicle 120 becomes 3 seconds when driving at the target speed. The processor 140 may control the lateral position of the unmanned vehicle 110-1 located in the front so that the relative distance becomes 0 m in the front of the danger driving vehicle 120.

When controlling the target speed of the unmanned vehicle 110-1 located in the front, the processor 140 may control the target speed to be less than 90% of the safe speed.

The processor 140 may control an unmanned vehicle 110-2 located at the rear side to a path that blocks the path of another vehicle driving in the third lane so that when the danger driving vehicle 120 changes the lane to the third lane, the unmanned vehicle 110-1 located in the front may also change the lane together.

The processor 140 may control the longitudinal position of the unmanned vehicle 110-2 located at the rear side to be maintained as before the lane change of the danger driving vehicle 120.

The processor 140 may control the lateral position of the unmanned vehicle 110-2 located at the rear side to a position spaced to the left by the width of the lane with respect to the danger driving vehicle 120.

When controlling the target speed of the unmanned vehicle 110-2 located at the rear side, the processor 140 may control the target speed to be less than 90% of the safe speed.

The processor 140 may control the longitudinal position of the unmanned vehicle 110-3 located in the third lane so that the danger driving vehicle 120 may change the lane to the third lane while a vehicle driving behind the danger driving vehicle 120 is located in the direction of the right taillight of the danger driving vehicle 120 in which lane change is impossible.

The processor 140 may control the lateral position of the unmanned vehicle 110-3 located in the third lane to the position spaced to the right by the width of the lane with respect to the danger driving vehicle 120.

Figure 9:
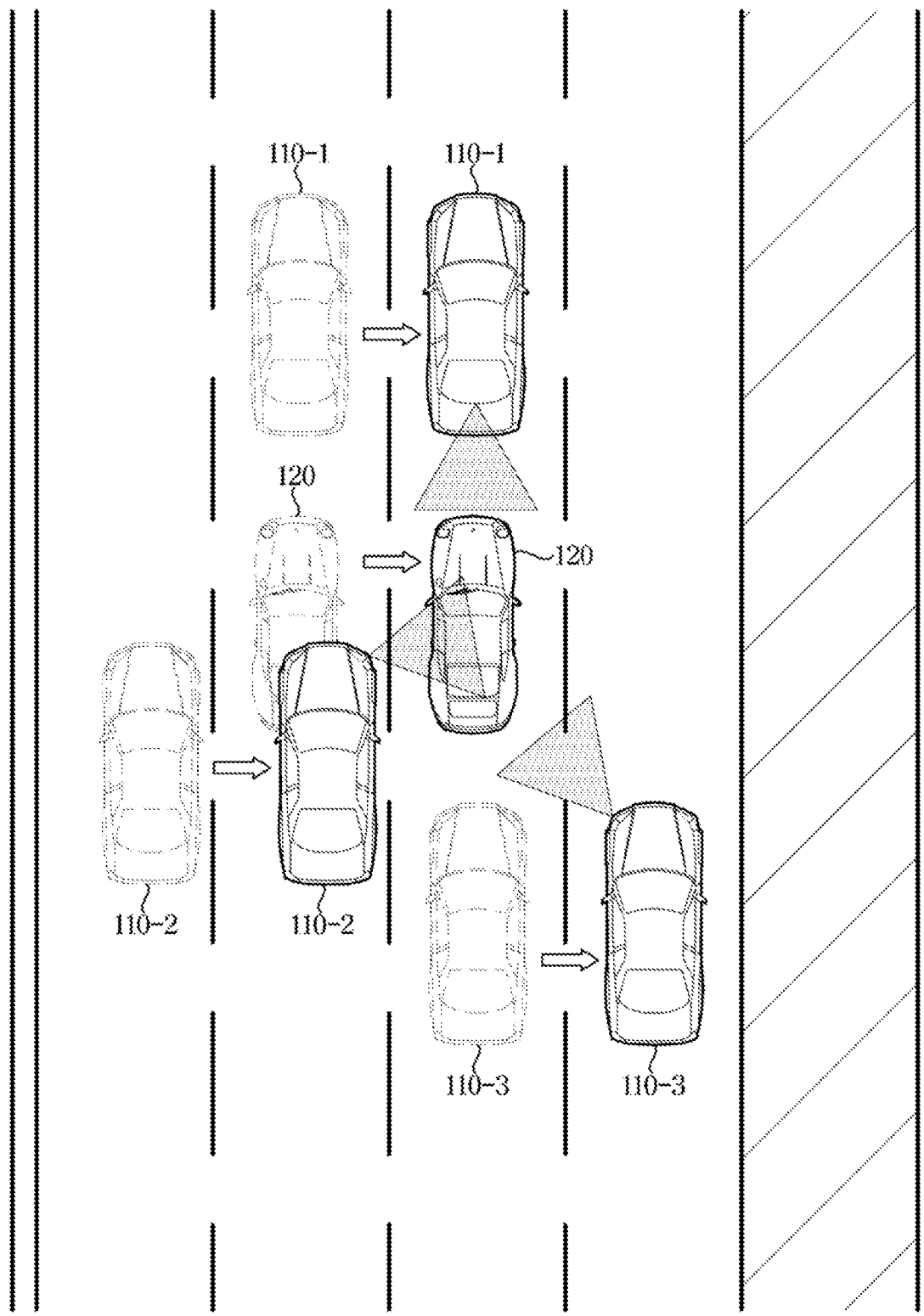
FIG. 9 is a diagram illustrating that the danger driving vehicle changes the lane to a third lane in the case in which the road has three lanes or more and there are three or more unmanned vehicles that may be deployed in the vehicle path control apparatus according to an exemplary embodiment.

FIG. 9 is a diagram illustrating that the danger driving vehicle 120 changes the lane to the third lane in the case in which the road has three lanes or more and there are three or more of the unmanned vehicles 110 that may be deployed in the vehicle path control apparatus according to an exemplary embodiment.

Referring to FIG. 9, the processor 140 may control only the lateral positions of the unmanned vehicles 110-1, 110-2 and 110-3 to be moved to the right by the width of the lane based on the center line from the positions of the danger driving vehicle 120 and the unmanned vehicles 110-1, 110-2 and 110-3, which have been described with reference to FIG. 8.

When controlling the target speed of the unmanned vehicles 110-1, 11.0-2 and 110-3, the processor 140 may control the target speed to be less than 90% of the safe speed.

Figure 10:
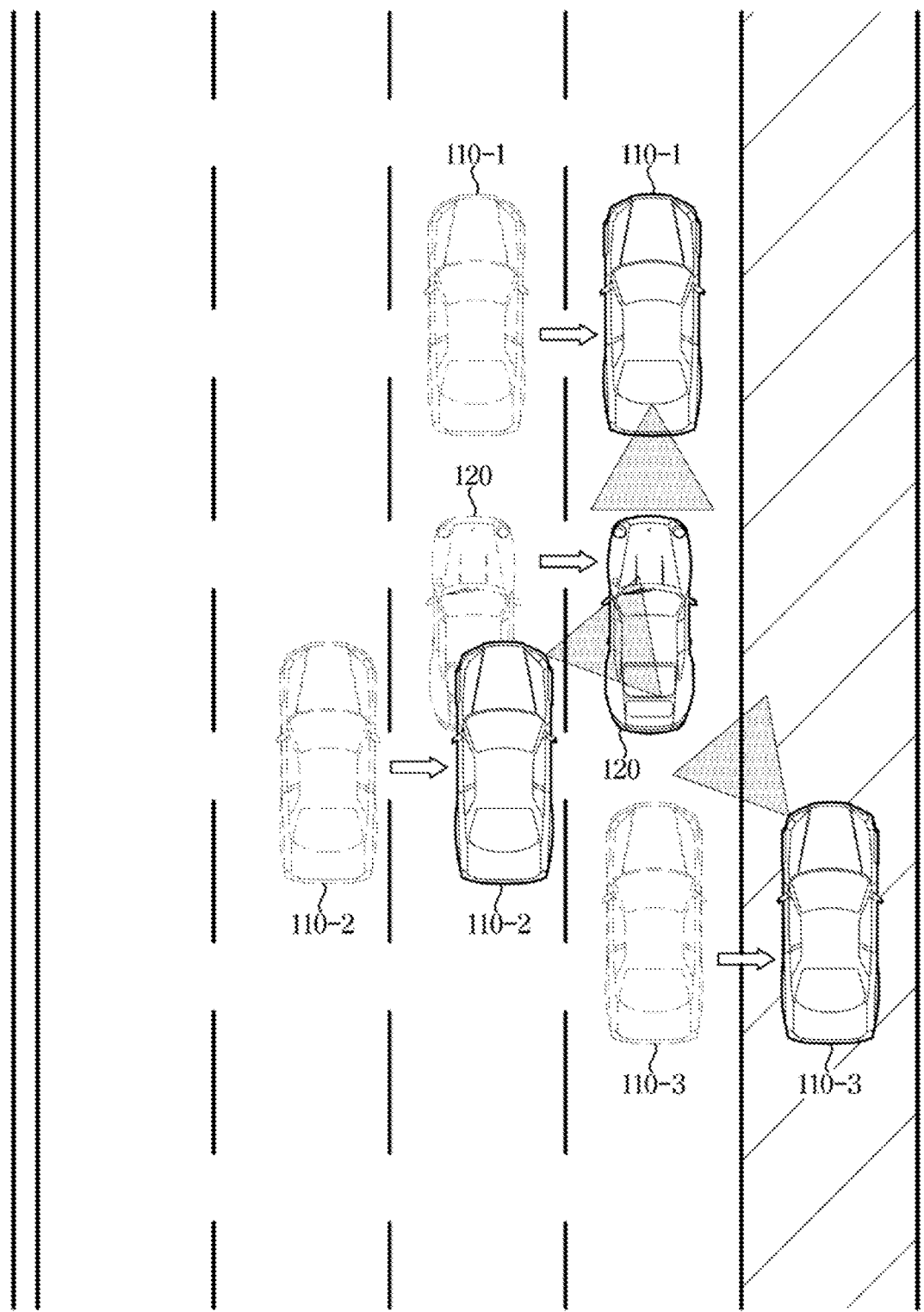
FIG. 10 is a diagram illustrating that the danger driving vehicle changes the lane to a fourth lane in the case in which the road has three lanes or more and there are three or more unmanned vehicles that may be deployed in the vehicle path control apparatus according to an exemplary embodiment.

FIG. 10 is a diagram illustrating that the danger driving vehicle 120 changes the lane to a fourth lane in the case in which the road has three lanes or more and there are three or more of the unmanned vehicles 110 that may be deployed in the vehicle path control apparatus according to an exemplary embodiment.

Referring to FIG. 10, the processor 140 may control only the lateral positions of the unmanned vehicles 110-1. 110-2 and 110-3 to be moved to the right by the width of the lane based on the center line from the positions of the danger driving vehicle 120 and the unmanned vehicles 110-1, 110-2 and 110-3, which have been described with reference to FIG. 8.

When controlling the target speed of the unmanned vehicles 110-1, 110-2 and 110-3, the processor 140 may control the target speed to be less than 90% of the sate speed.

Figure 11:
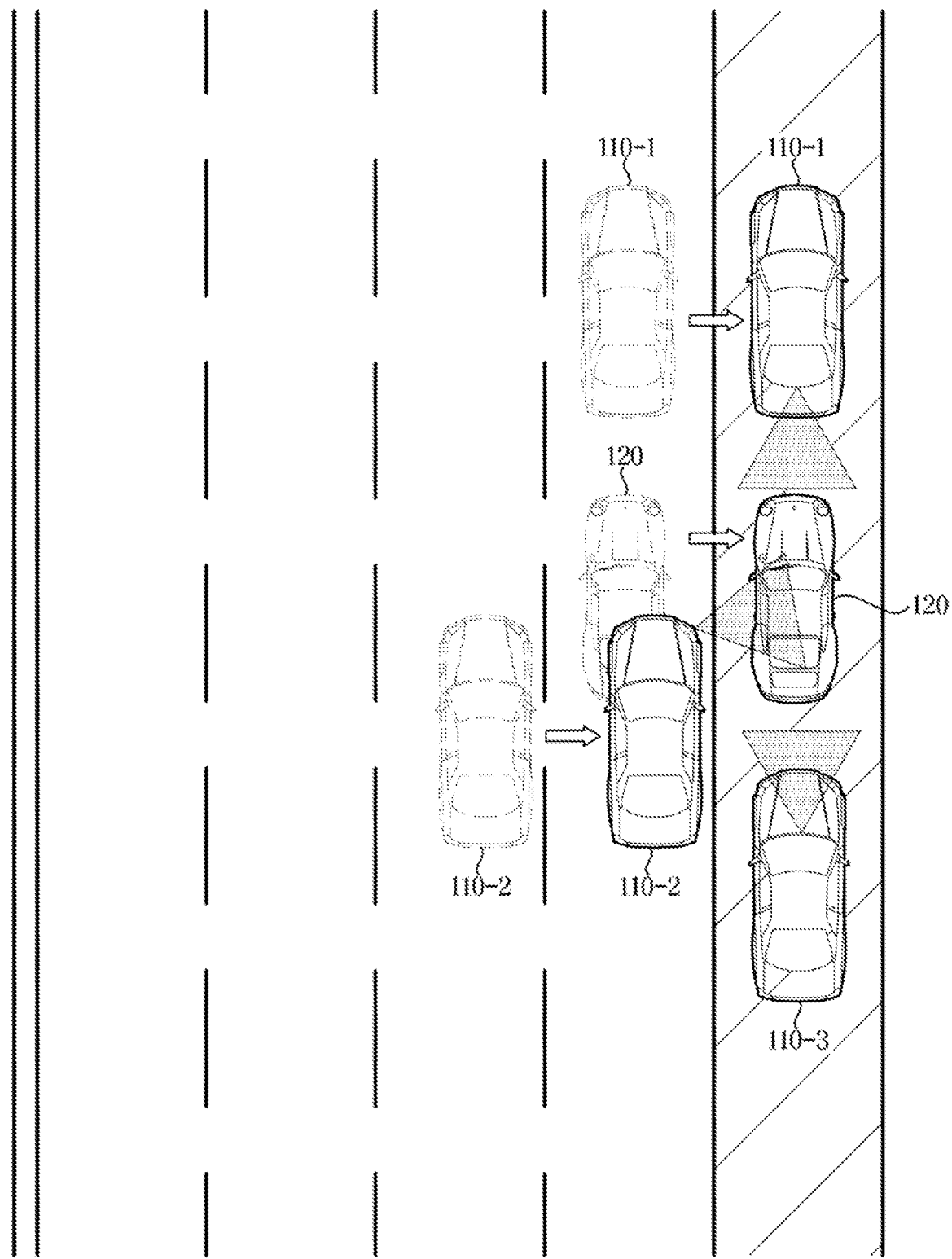
FIG. 11 is a diagram illustrating that the danger driving vehicle changes the lane to the shoulder in the case in which the road has three lanes or more and there are three or more unmanned vehicles that may be deployed in the vehicle path control apparatus according to an exemplary embodiment.

FIG. 11 is a diagram illustrating that the danger driving vehicle 120 changes the lane to the shoulder in the case in which the road has three lanes or more and there are three or more of the unmanned vehicles 110 that may be deployed in the vehicle path control apparatus according to an exemplary embodiment.

Referring to FIG. 11, the processor 140 may control the path to maintain the position of the unmanned vehicle 110-3 located at the rear side of the danger driving vehicle 120 so that the danger driving vehicle 120 may not escape by reducing the speed.

The processor 140 may control only lateral positions of the unmanned vehicle 110-1 located in the front and the unmanned vehicle 110-2 located on the left with respect to the danger driving vehicle 120 to be moved to the right by the width of the lane based on the center line from the positions of the danger driving vehicle 120 and the unmanned vehicles 110-1, 110-2 and 110-3, which have been described with reference to FIG. 8.

When controlling the target speed of the unmanned vehicles 110-1, 110-2 and 110-3, the processor 140 may control the target speed to be less than 90% of the safe speed.

Figure 12:
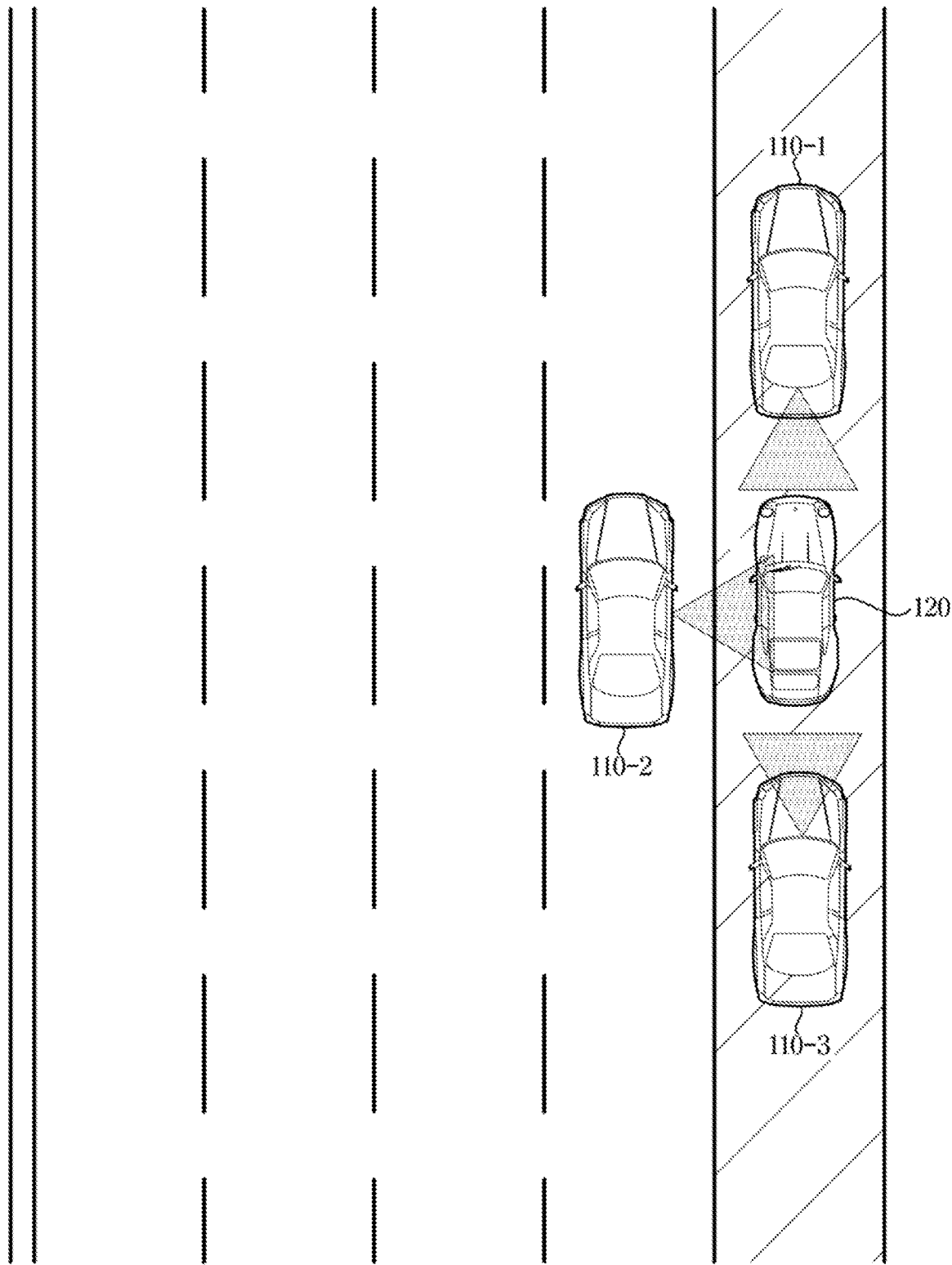
FIG. 12 is a diagram illustrating that the danger driving vehicle is stopped on the shoulder in the case in which the road has three lanes or more and there are three or more unmanned vehicles that may be deployed in the vehicle path control apparatus according to an exemplary embodiment.

FIG. 12 is a diagram illustrating that the danger driving vehicle 120 is stopped on the shoulder in the case in which the road has three lanes or more and there are three or more of the unmanned vehicles 110 that may be deployed in the vehicle path control apparatus according to an exemplary embodiment.

When it is determined that the danger driving vehicle 120 is driving on the shoulder, the processor 140 may induce the stop of the danger driving vehicle 120 by reducing the speed of the unmanned vehicles 110-1. 110-2 and 110-3.

When the danger driving vehicle 120 stops on the shoulder, the processor 140 may block the path of the danger driving vehicle 120 by stopping the unmanned vehicles 110-1, 110-2, and 110-3 until a police officer arrive.

When identifying that the police officer has arrived, the processor 140 releases the control of the unmanned vehicles 110-1, 110-2 and 110-3 so that the unmanned vehicles 110-1, 110-2 and 110-3 are used for their original purpose. Thereafter, the processor 140 may notify the users of the unmanned vehicle 110-1, 110-2 and 110-3 of the compensation amount of money considering the usage time of the unmanned vehicles 110-1, 110-2 and 110-3 and the amount of fuel used, and how far the unmanned vehicles 110-1, 110-2 and 110-3 are deviated from the existing path, etc.

There is no limit to the method of notifying the users of the unmanned vehicles 110-1, 110-2, and 110-3 of information about the compensation, and when the unmanned vehicles 110-1. 110-2, and 110-3 is controlled through a smart device such as a smart phone, a message or a notification may be transmitted to the smart phone.

Figure 13:
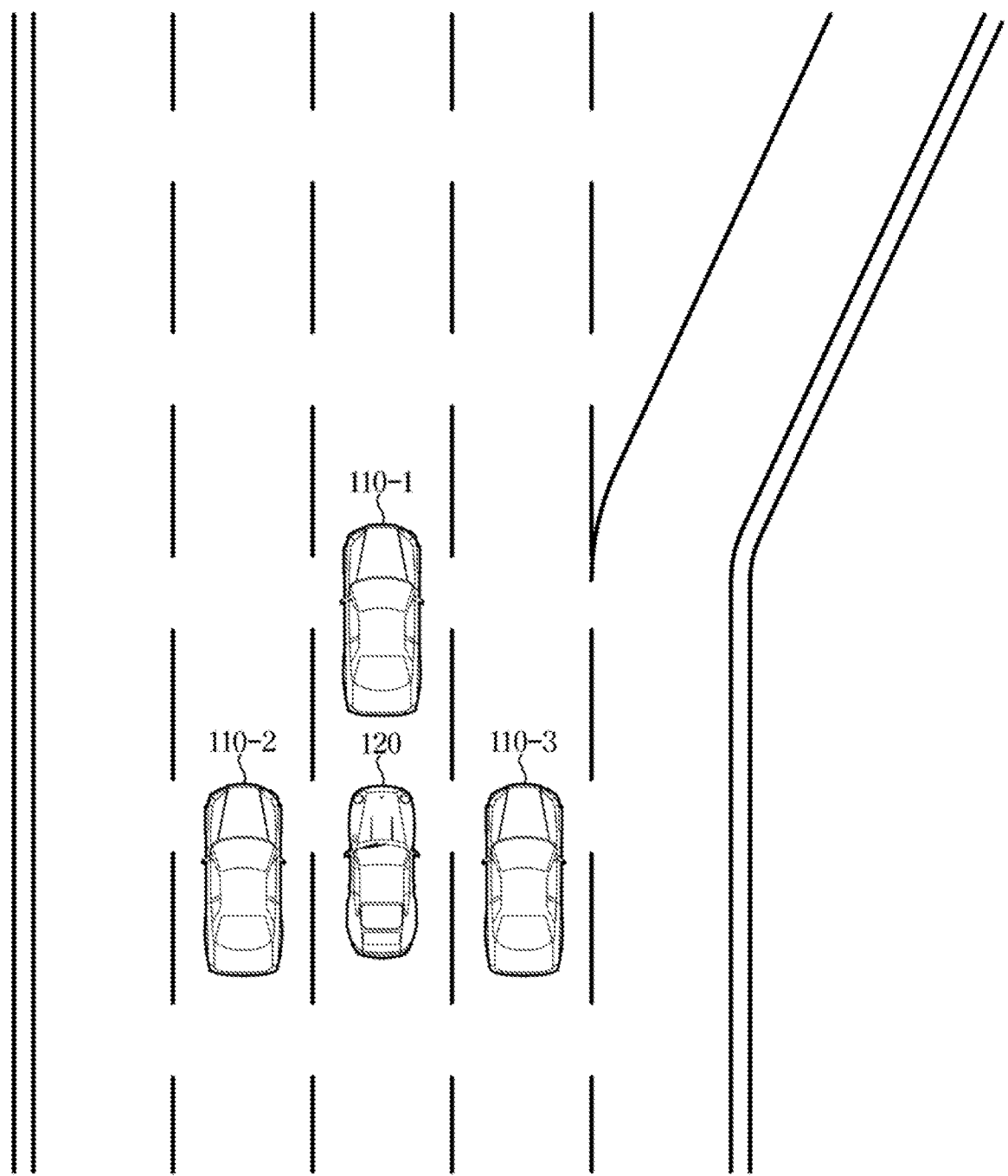
FIG. 13 is a diagram illustrating that a lane change of the danger driving vehicle is blocked when there is an exit road in the vehicle path control apparatus according to an exemplary embodiment.

FIG. 13 is a diagram illustrating that a lane change of the danger driving vehicle 120 is blocked when there is an exit road in the vehicle path control apparatus according to an exemplary embodiment.

Referring to FIG. 13, the processor 140 may block a path from which a danger driving vehicle may escape when there is a risk of the danger vehicle escaping because there is a JC, a roadside rest stop, or the like in the path where the danger driving vehicle 120 is expected to stop.

Specifically, the processor 140 may control the longitudinal position of the unmanned vehicle 110-3 located on the right with respect to the danger driving vehicle 120 to be the same as that of the danger driving vehicle 120 and control the lateral position of the unmanned vehicle 110-3 to be moved to the right by the width of the lane with respect to the danger driving vehicle 120.

As such, when the processor 140 controls the unmanned vehicles 110-1, 110-2, and 110-3, the process of inducing the danger driving vehicle 120 to drive on the shoulder may be temporarily interrupted, and the processor 140 may block the lane change of the danger driving vehicle 120 until the danger driving vehicle 120 passes an escapable road. Thereafter, when it is determined that the danger driving vehicle 120 has passed a location where there is the escapable road, the processor 140 may induce the danger driving vehicle 120 to stop on the shoulder.

The processor 140 may temporarily interrupt the operation of the system until the danger driving vehicle 120 passes the location in an exceptional situation such as an escapable road.

For example, when a temporary structure such as a drum, a rubber cone, and a PE fence is identified, the processor 140 may interrupt the path control and switch to autonomous driving until the danger driving vehicle 120 passes the structure, and may perform the path control again when the danger driving vehicle 120 passes the structure.

Figure 14:
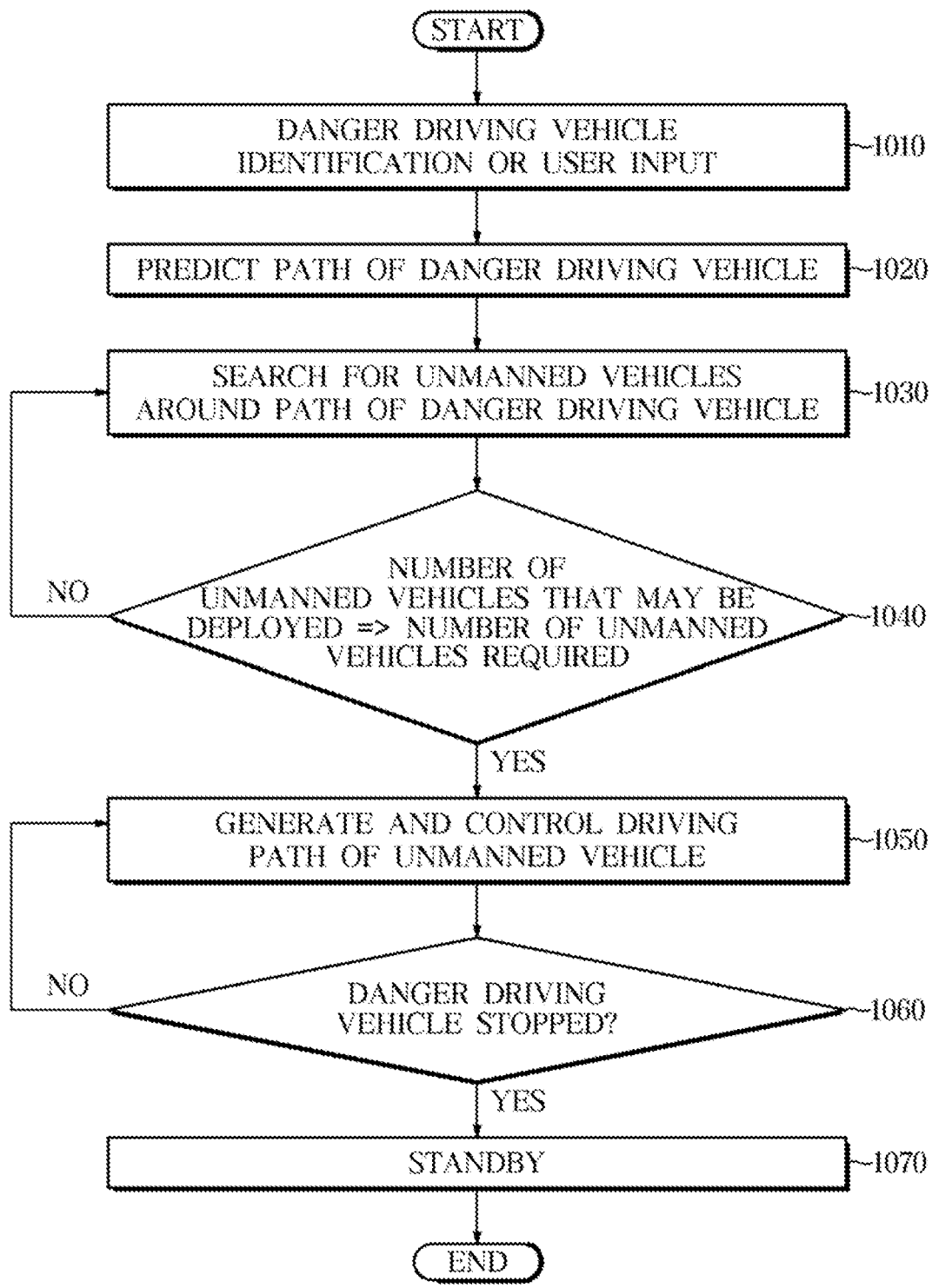
FIG. 14 is a flowchart illustrating an example of a method of obstructing a path of the danger driving vehicle in the vehicle path control apparatus according to an exemplary embodiment.

FIG. 14 is a flowchart illustrating an example of a method of obstructing a path of the danger driving vehicle 120 in the vehicle path control apparatus according to an exemplary embodiment.

Hereinafter, a general flow for obstructing the path of the danger driving vehicle 120 according to an exemplary embodiment of the present disclosure will be described with reference to FIG. 14.

When there is no unmanned vehicle 110 that may be currently deployed, or the course of the danger driving vehicle 120 is obstructed with unmanned vehicles 110 less than the maximum number of vehicles that may be deployed, the processor 140 may continue to search for the unmanned vehicle 110 until a sufficient number of the unmanned vehicles 110 is secured.

When the search for the unmanned vehicle 110 is completed and one or more unmanned vehicles 110 are registered in the danger driving vehicle data 200 or it is identified that the user directly registers the vehicle in the danger driving vehicle data 200 (1010), the processor 140 may predict the path of the danger driving vehicle 120 (1020).

The processor 140 may identify the unmanned vehicle 110 that may be utilized for the path control within a preset distance around the path of the danger driving vehicle 120 (1030).

The processor 140 may also set the preset distance differently depending on a user input, or calculate a minimum distance at which the path of the danger driving vehicle 120 may be obstructed by acceleration based on the speed of the danger driving vehicle 120.

The processor 140 may search for the unmanned vehicle 110 until the number of the unmanned vehicles 110 that may be deployed for the path control is one or more and becomes greater than the number of the unmanned vehicles 110 required for a complete stop (two for two lanes or less and three for three lanes or more) (NO of 1040).

When the number of the unmanned vehicles 110 that may be deployed is determined (YES of 1040), the processor 140 may generate a driving path of the unmanned vehicle 110 based on the road information and the number of the deployed vehicles (1050).

Thereafter, the processor 140 may continue to control the driving path of the dangerous vehicle until the dangerous vehicle stops (NO of 1060), and may put the unmanned vehicle 110 on standby until the police officer arrive (1070) when the dangerous vehicle stops (YES of 1060).

When the police officer arrives, the processor 140 may release the control of the unmanned vehicle 110 so that the unmanned vehicle 110 may be used for its original purpose, and notifies the user of the unmanned vehicle 110 of the information about compensation.

Figure 15A:
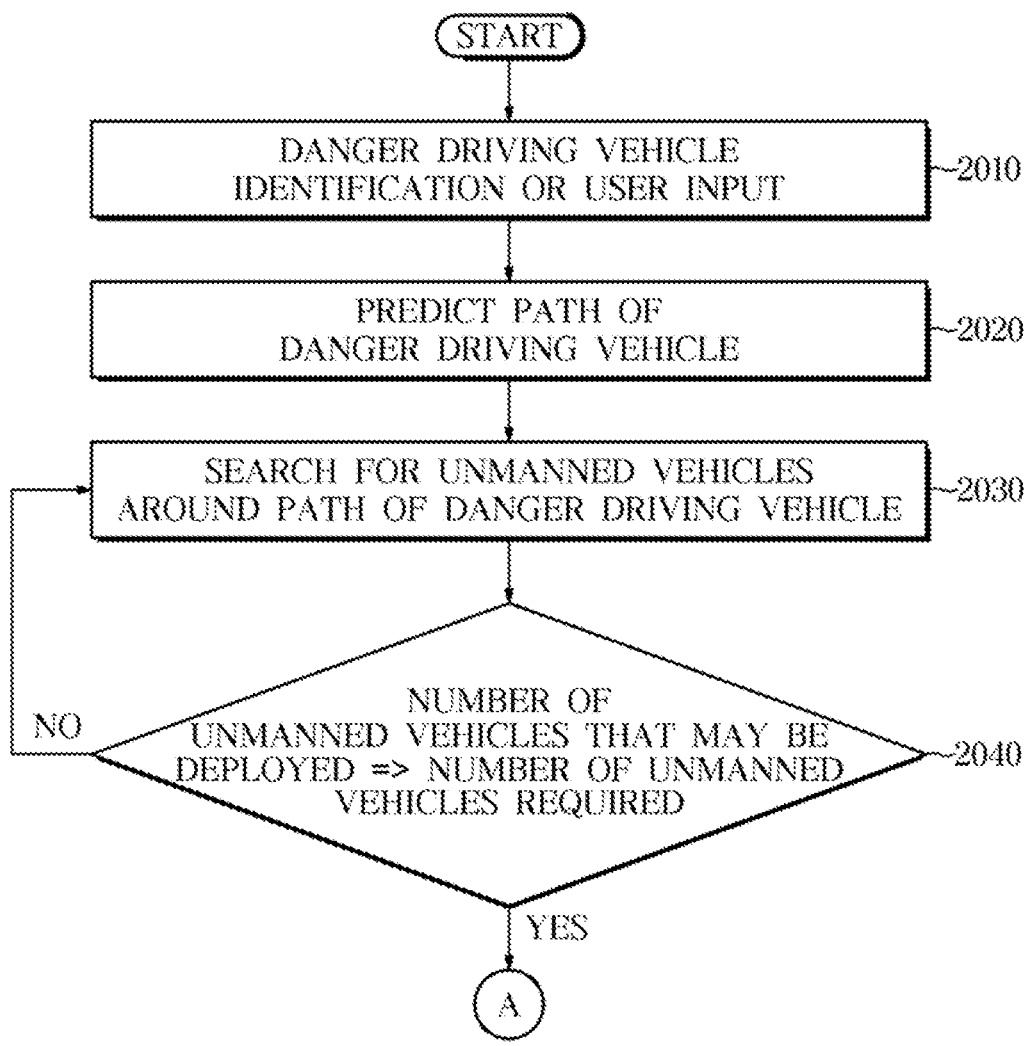
FIGS. 15A and 15B are a flowchart illustrating an example of a case where there is an exit road in a process of obstructing the path of the danger driving vehicle in the vehicle path control apparatus according to an exemplary embodiment.
Figure 15B:
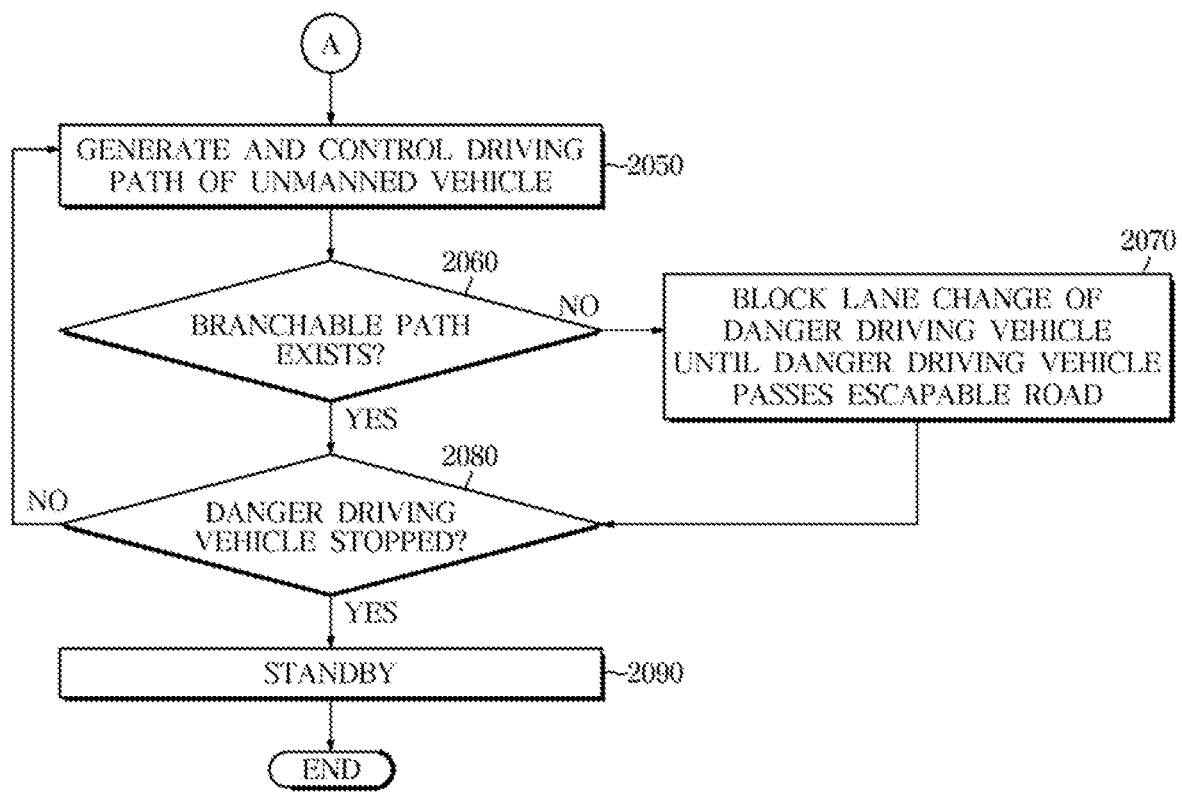

FIGS. 15A and 15B are a flowchart illustrating an example of a case where there is a branch (exit road) in a process of obstructing the path of the danger driving vehicle 120 in the vehicle path control apparatus according to an exemplary embodiment.

FIGS. 15A and 15B illustrate a control method when there is a branch from which the dangerous vehicle may escape because there is a JC, a roadside rest stop, or the like in the path where the dangerous vehicle is expected to stop after the driving path of the unmanned vehicle 110 is generated among the contents described with reference to FIG. 14.

The processor 140 may generate a driving path of the unmanned vehicle 110 based on the path of the danger driving vehicle 120 (from 2010 to 2050), and may transmit the driving path to the unmanned vehicle 110 and determine that an escapable path exists (YES of 2060).

The processor 140 may, based on the identification of the escapable path, control the longitudinal position of the unmanned vehicle 110 located on the right with respect to the danger driving vehicle 120 to be the same as that of the danger driving vehicle 120 and control the lateral position of the unmanned vehicle 110 to be moved to the right by the width of the lane with respect to the danger driving vehicle 120.

As such, when the processor 140 controls the unmanned vehicle 110, the process of inducing the danger driving vehicle 120 to drive on the shoulder may be temporarily interrupted, and the processor 140 may block the lane change of the danger driving vehicle 120 until the danger driving vehicle 120 passes the escapable road (2070). Thereafter, when it is determined that the danger driving vehicle 120 has passed a location where there is the escapable road, the processor 140 may induce the danger driving vehicle 120 to stop on the shoulder (2080), and then may put the unmanned vehicle 110 on standby (2090).

Figure 16:
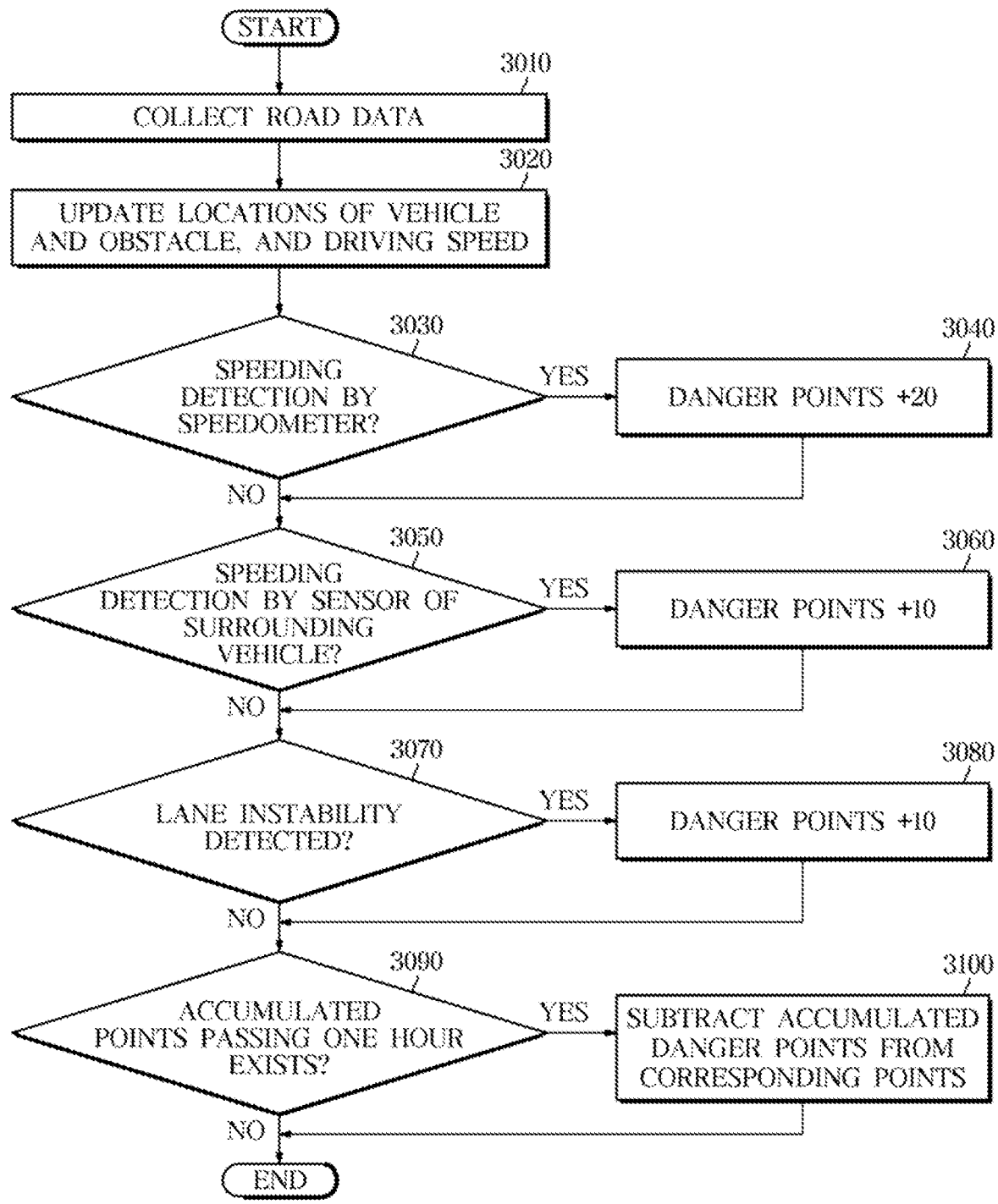
FIG. 16 is a flowchart illustrating calculation of a score for determining as the danger driving vehicle in the vehicle path control apparatus according to an exemplary embodiment.

FIG. 16 is a flowchart illustrating calculation of a score for determining as the danger driving vehicle 120 in the vehicle path control apparatus according to an exemplary embodiment.

The processor 140 may utilize a driving score in a process of classifying a vehicle driving on a road as the danger driving vehicle 120.

The driving score may be imparted depending on a behavior of the vehicle driving on the road, and the driving score may be accumulated.

Road data may be collected to calculate the driving score (3010), and a location of a vehicle, a location of an obstacle, a driving speed, and the like may be updated (3020).

As an example in which the driving score is calculated, accumulation of the driving score is possible, such as adding 20 points to the driving score (3040) when speeding is detected by a speedometer (YES of 3030), adding 10 points to the driving score (3060) when speeding is detected by a sensor of a surrounding vehicle (YES of 3050), and adding 10 points to the driving score (3080) when several lanes are changed at once or two lanes are used (YES of 3070).

In addition, the processor 140 may prevent a malfunction due to the accumulation of the driving score by using a method of subtracting (3100) the accumulated points passing one hour (YES of 3090) from the corresponding points.

As is apparent from the above, according to a vehicle path control apparatus and a control method thereof according to a disclosure, a personal accident may be prevented in advance in a process of obstructing a course of a danger driving vehicle. Therefore, the vehicle path control apparatus and the control method thereof may obstruct the course of the danger driving vehicle more actively than a manned driving vehicle.

The embodiments disclosed with reference to the accompanying drawings have been described above. It will be understood by those skilled in the art that various changes in form and details may be made therein without departing from the spirit and scope of the present disclosure as defined by the appended claims. The disclosed embodiments are illustrative and should not be construed as limiting.

What is claimed is:

1. A vehicle path control apparatus comprising:
   a memory provided to store danger driving vehicle data;
   a communication device provided to receive road information from an external server; and
   a processor configured to:
   identify a danger driving vehicle driving on a road based on the road information and the danger driving vehicle data, wherein the processor is configured to calculate a danger driving score of a vehicle and to determine the vehicle as the danger driving vehicle when the score is greater than or equal to a preset score,
   select an unmanned vehicle driving within a preset distance from the danger driving vehicle based on the road information,
   generate a driving path of the unmanned vehicle for obstructing a course of the danger driving vehicle based on an expected path of the danger driving vehicle, and
   control the communication device to transmit information on the driving path to the unmanned vehicle.

2. The vehicle path control apparatus according to claim 1, wherein
   the processor is further configured to determine priority in the order in which the unmanned vehicle suffers a small damage and select the unmanned vehicle depending on the priority.

3. The vehicle path control apparatus according to claim 1, wherein
   the processor is further configured to determine the number of the unmanned vehicles based on the number of lanes.

4. The vehicle path control apparatus according to claim 1, wherein
   the processor is further configured to notify an owner of the unmanned vehicle and surrounding vehicles that the unmanned vehicle is used to obstruct a course of a dangerous vehicle.

5. The vehicle path control apparatus according to claim 1, wherein
   the processor is further configured to block a lane change until the danger driving vehicle passes a branchable driving path.

6. The vehicle path control apparatus according to claim 1, wherein
   the processor is further configured to put the unmanned vehicle on standby until there is a user input, based on the stopping of the danger driving vehicle.

7. The vehicle path control apparatus according to claim 1, wherein
   addition or deletion of the danger driving vehicle to or from the danger driving vehicle data is possible by a user through a user interface.

8. A vehicle comprising the vehicle path control apparatus of claim 1.

9. The vehicle of claim 8, further comprising a sensor device configured to:
   detect surrounding environment;
   recognize vehicle information; and
   communicate with the memory, the communication device and the processor.

10. A vehicle path control method comprising:
    determining whether a vehicle is a danger driving vehicle based on road information collected;
    identifying the danger driving vehicle driving on a road based on the road information and danger driving vehicle data, wherein identifying the danger driving vehicle includes calculating a danger driving score of the vehicle and determining the vehicle as the danger driving vehicle when the score is greater than or equal to a preset score;
    selecting an unmanned vehicle driving within a preset distance with respect to the danger driving vehicle based on the road information;
    generating a driving path of the unmanned vehicle for obstructing a course of the danger driving vehicle based on an expected path of the danger driving vehicle; and
    transmitting information on the driving path to the unmanned vehicle through a communication device.

11. The vehicle path control method according to claim 10, wherein
    the selecting of the unmanned vehicle comprises determining the number of the unmanned vehicles based on the number of lanes.

12. The vehicle path control method according to claim 10, wherein
    the selecting of the unmanned vehicle comprises notifying an owner of the unmanned vehicle and surrounding vehicles that the unmanned vehicle is used to obstruct a course of a dangerous vehicle.

13. The vehicle path control method according to claim 10, wherein
    the selecting of the unmanned vehicle comprises determining priority in the order in which the unmanned vehicle suffers a small damage and selecting the unmanned vehicle depending on the priority.

14. The vehicle path control method according to claim 10, wherein
    the generating of the driving path of the unmanned vehicle comprises blocking a lane change until the danger driving vehicle passes a branchable driving path.

15. The vehicle path control method according to claim 10, wherein
    the generating of the danger driving vehicle data comprises adding or deleting the danger driving vehicle to or from the danger driving vehicle data by a user.

16. The vehicle path control method according to claim 10, wherein the generating of the danger driving vehicle data comprises putting the unmanned vehicle on standby until there is a user input, based on the stopping of the danger driving vehicle.

17. The vehicle path control method according to claim 10, further detecting surrounding environment using a sensor device.

18. The vehicle path control method according to claim 10, further recognizing vehicle information using a sensor device.

* * * * *